(12) United States Patent
Sasaki et al.

(10) Patent No.: US 7,877,860 B2
(45) Date of Patent: Feb. 1, 2011

(54) METHOD OF MANUFACTURING A MAGNETIC HEAD FOR PERPENDICULAR MAGNETIC RECORDING

(75) Inventors: Yoshitaka Sasaki, Milpitas, CA (US); Hiroyuki Itoh, Milpitas, CA (US); Shigeki Tanemura, Milpitas, CA (US); Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/379,423

(22) Filed: Feb. 20, 2009

(65) Prior Publication Data

US 2009/0158582 A1 Jun. 25, 2009

Related U.S. Application Data

(62) Division of application No. 10/944,010, filed on Sep. 20, 2004, now Pat. No. 7,516,538.

(51) Int. Cl.
*G11B 5/127* (2006.01)
*H04R 31/00* (2006.01)

(52) U.S. Cl. .............. 29/603.16; 29/603.11; 29/603.13; 29/603.15; 29/603.18; 216/62; 216/66; 216/67; 360/121; 360/122; 360/317; 451/5; 451/41

(58) Field of Classification Search .............. 29/603.11, 29/603.13–603.16, 603.18, 605, 606; 216/62, 216/66, 67; 360/121, 122, 317; 427/127, 427/128; 451/5, 41

See application file for complete search history.

(56) References Cited

U.S. PATENT DOCUMENTS

| 4,656,546 | A | 4/1987 | Mallory |
| 5,649,351 | A | 7/1997 | Cole et al. |
| 5,916,423 | A | 6/1999 | Westwood |
| 6,243,939 | B1 | 6/2001 | Chen et al. |
| 6,432,562 | B1 * | 8/2002 | Wu et al. ............... 428/826 |
| 6,504,675 | B1 | 1/2003 | Shukh et al. |
| 7,312,952 | B2 * | 12/2007 | Kobayashi ............. 360/125.33 |
| 2003/0151850 | A1 | 8/2003 | Nakamura et al. |
| 2004/0032692 | A1 | 2/2004 | Kobayashi |

FOREIGN PATENT DOCUMENTS

| JP | A 04-216626 | 8/1992 |
| JP | A 10-198930 | 7/1998 |
| JP | A 11-134612 | 5/1999 |
| JP | A 2003-203311 | 7/2003 |
| JP | A 2003-242607 | 8/2003 |
| JP | A 2004-79081 | 3/2004 |

* cited by examiner

*Primary Examiner*—Paul D Kim
(74) *Attorney, Agent, or Firm*—Oliff & Berridge, PLC

(57) ABSTRACT

A method of manufacturing a magnetic head includes the steps of forming an underlying layer, forming a pole layer including a track width defining portion at least by plating, using the underlying layer as an electrode, such that the track width defining portion is disposed on the underlying layer, and removing the underlying layer except a portion below the pole layer by ion beam etching. The underlying layer is made of a conductive material whose etching rate of ion beam etching is higher than that of the magnetic alloy used to make the pole layer.

3 Claims, 30 Drawing Sheets

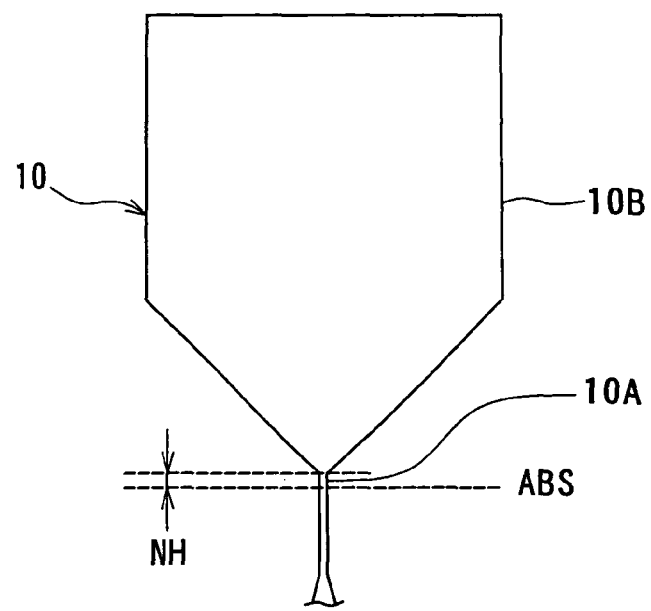
FIG. 3
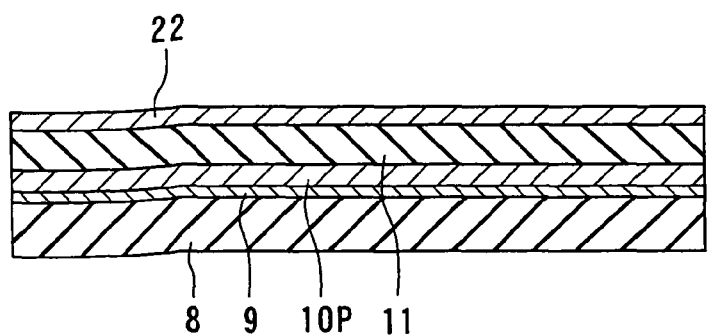 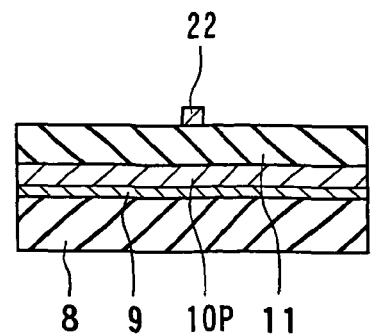
FIG. 4A  FIG. 4B

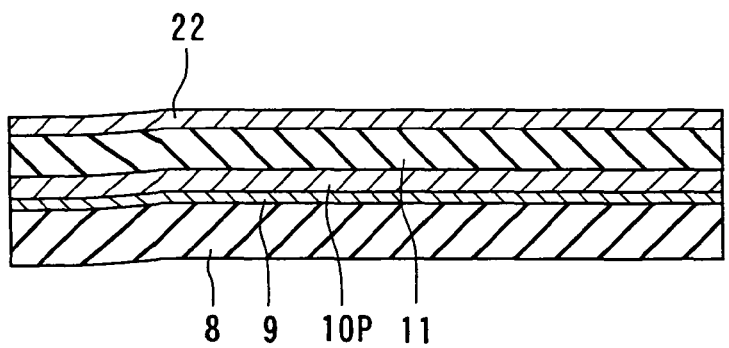 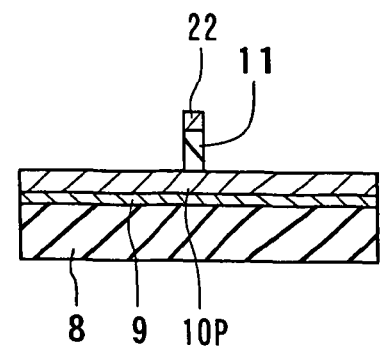
FIG. 5A　　　　　　　FIG. 5B
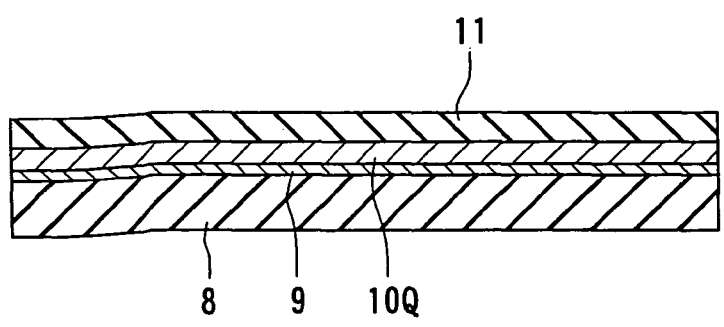 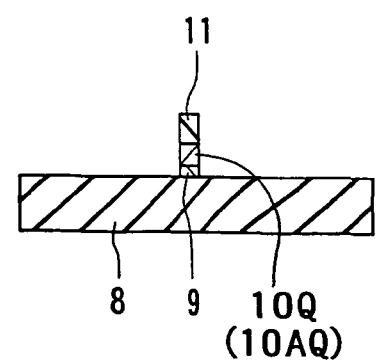
FIG. 6A　　　　　　　FIG. 6B

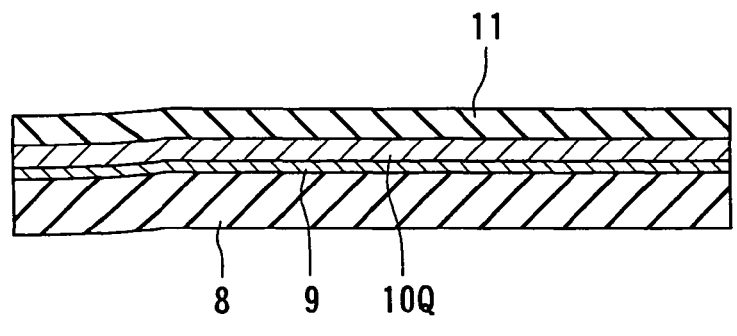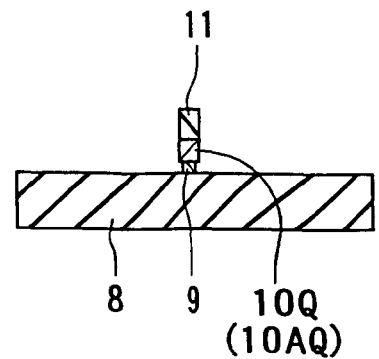
FIG. 7A                    FIG. 7B
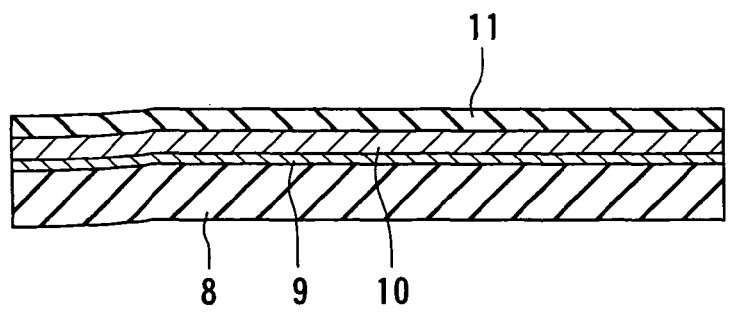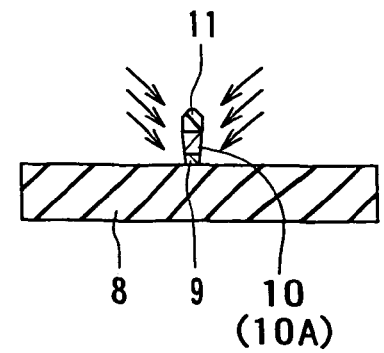
FIG. 8A                    FIG. 8B

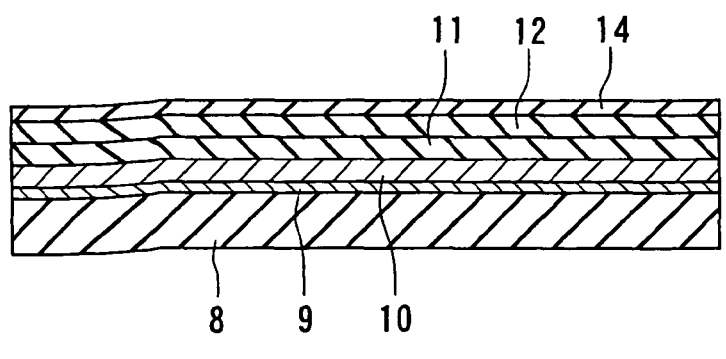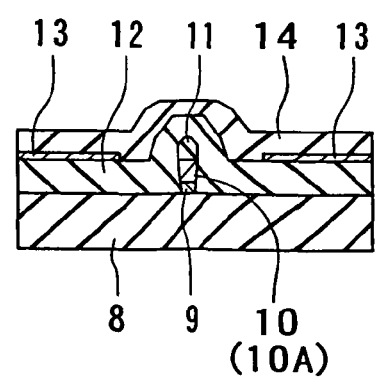
FIG. 9A  FIG. 9B
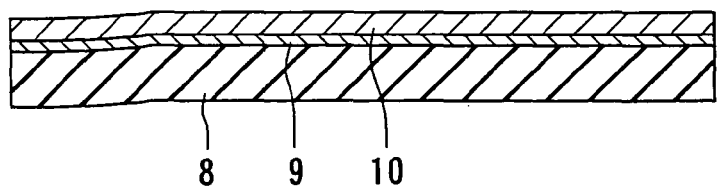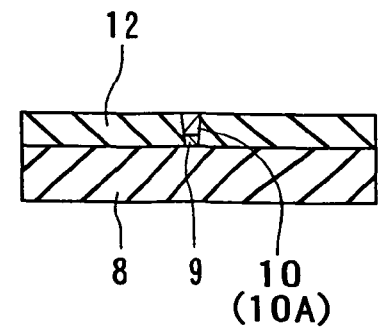
FIG. 10A  FIG. 10B

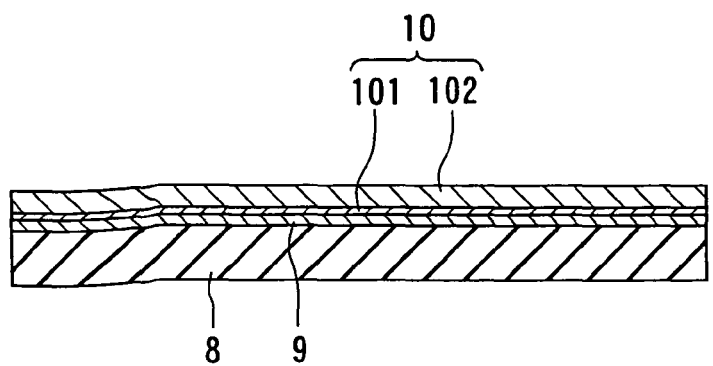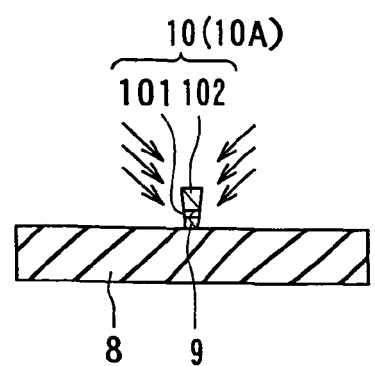
FIG. 20A          FIG. 20B
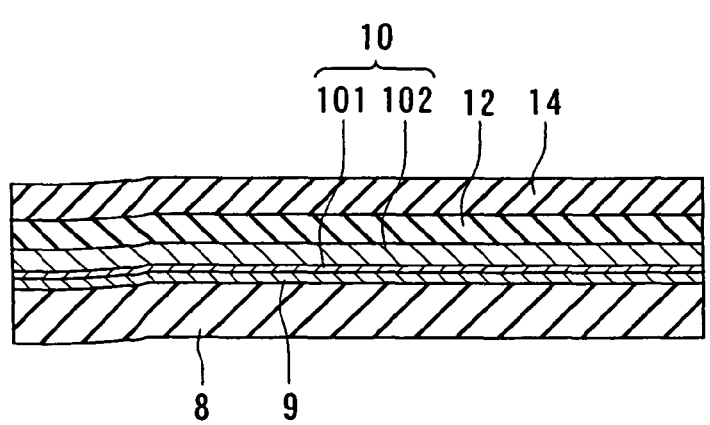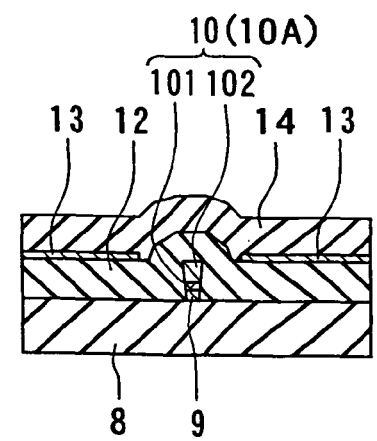
FIG. 21A          FIG. 21B

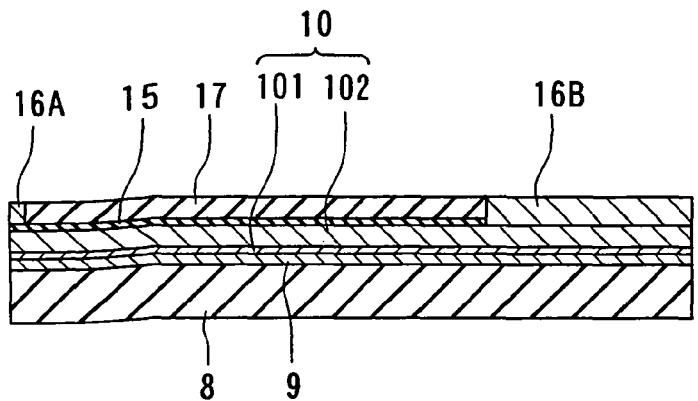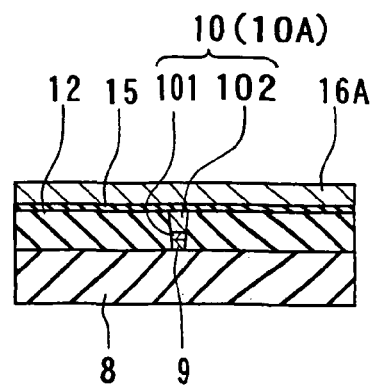
FIG. 22A  FIG. 22B
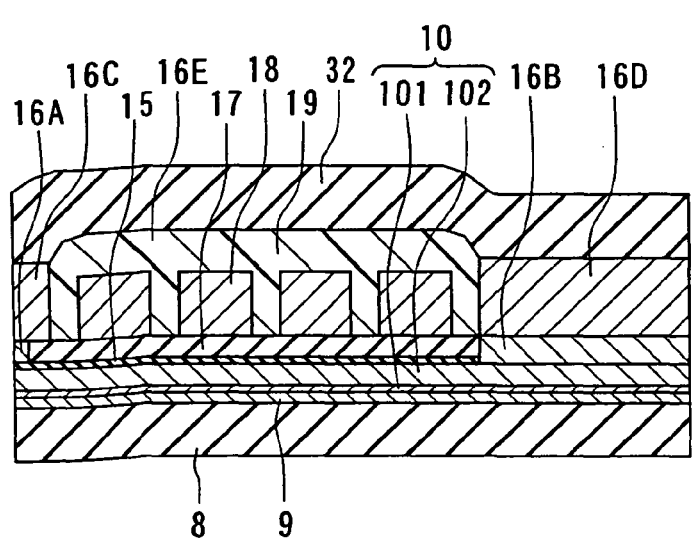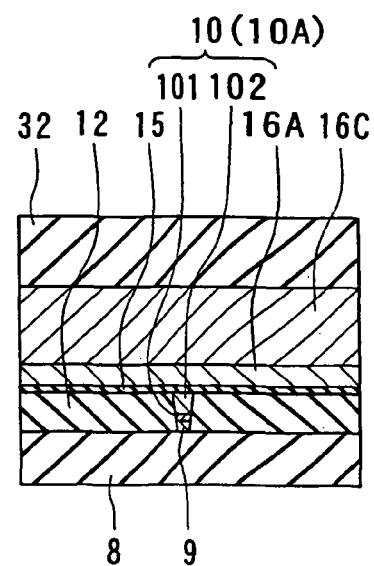
FIG. 23A  FIG. 23B

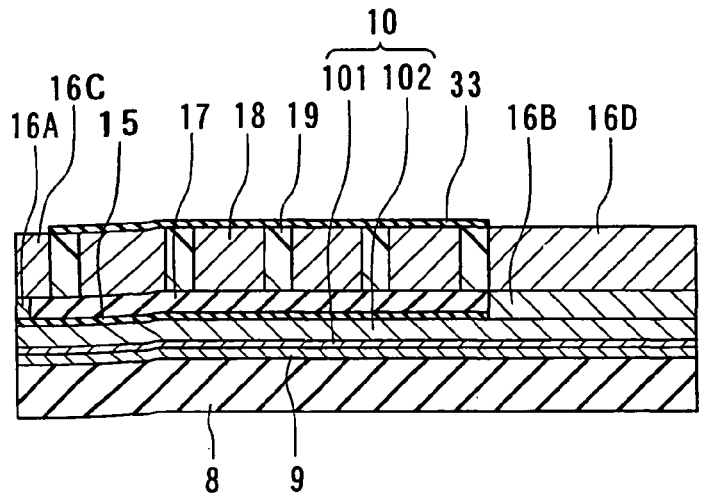
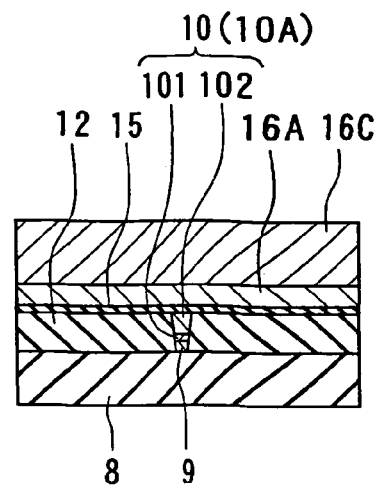
FIG. 24A  FIG. 24B
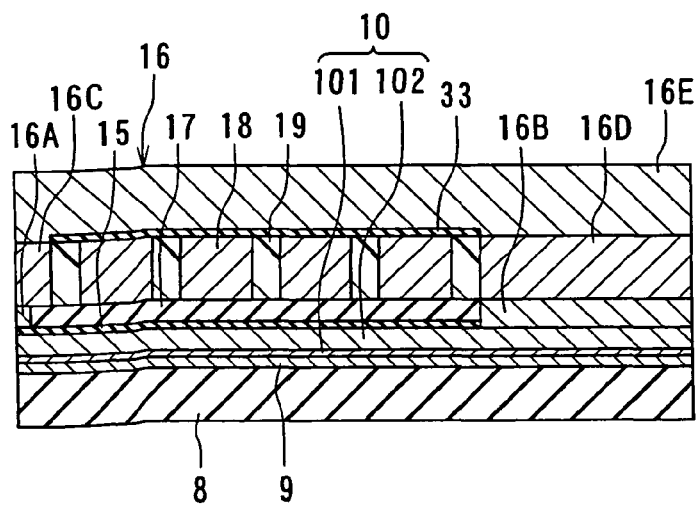
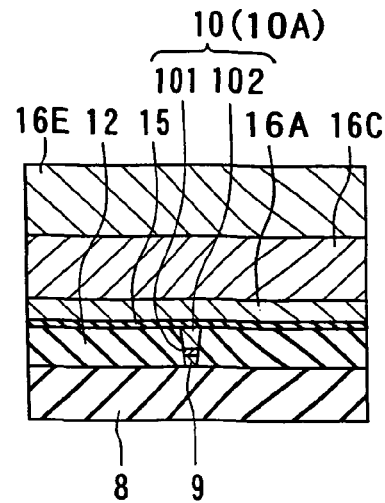
FIG. 25A  FIG. 25B

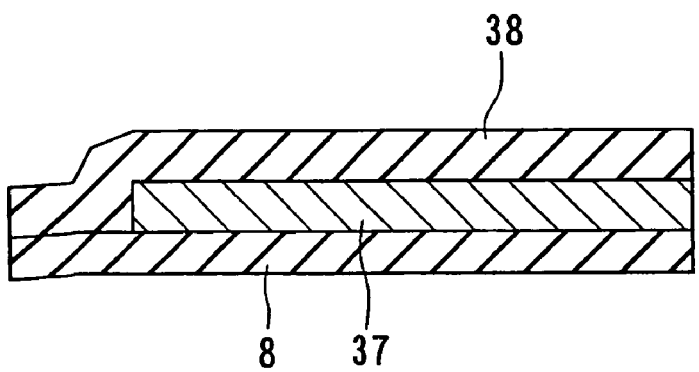
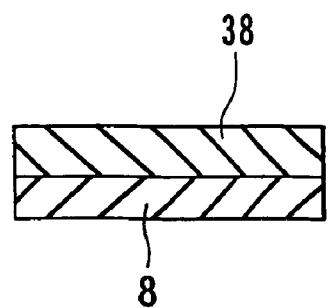
FIG. 26A  FIG. 26B
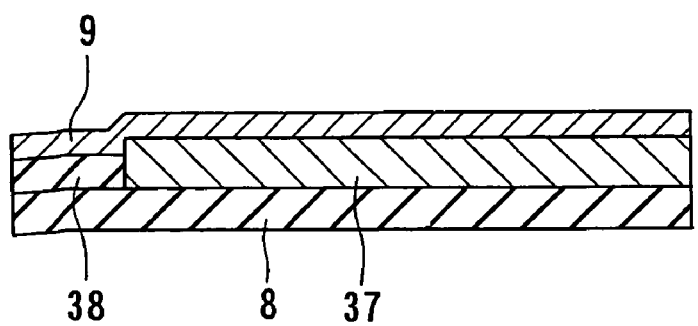
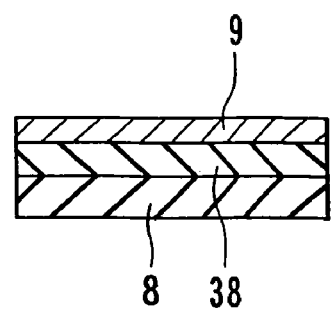
FIG. 27A  FIG. 27B

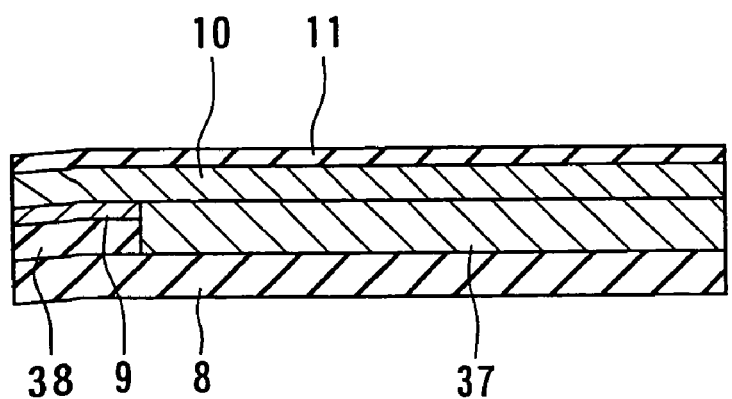 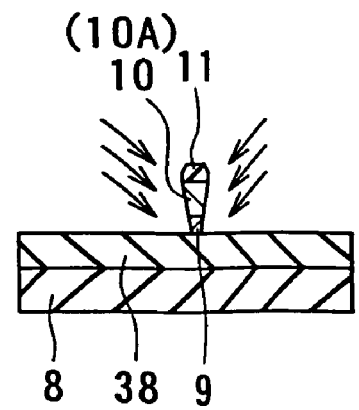
FIG. 30A  FIG. 30B
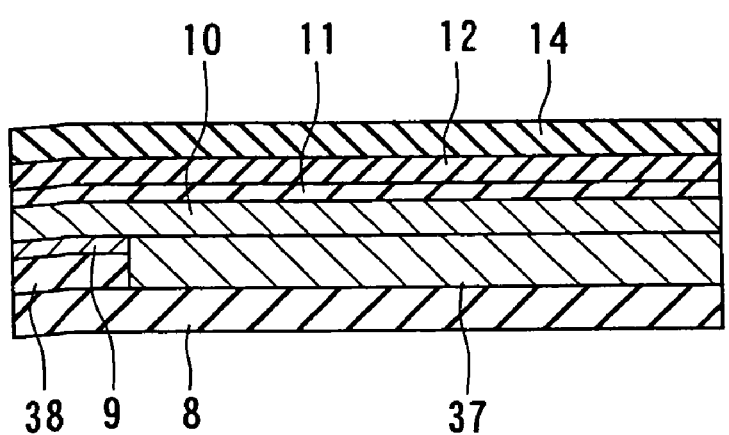 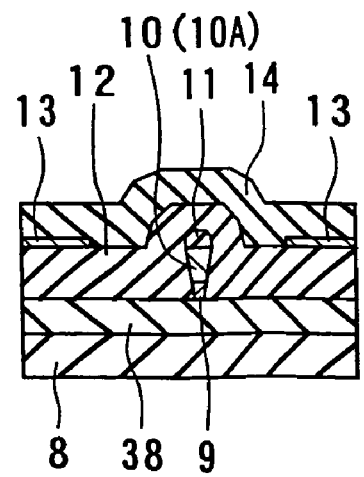
FIG. 31A  FIG. 31B

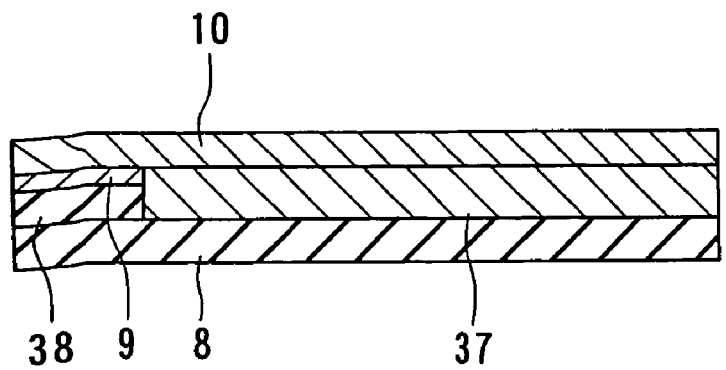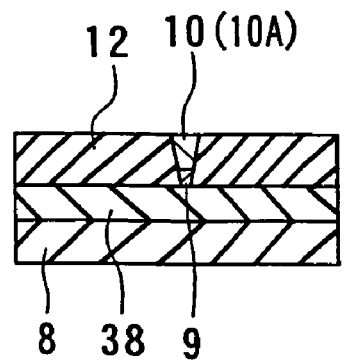
FIG. 32A  FIG. 32B
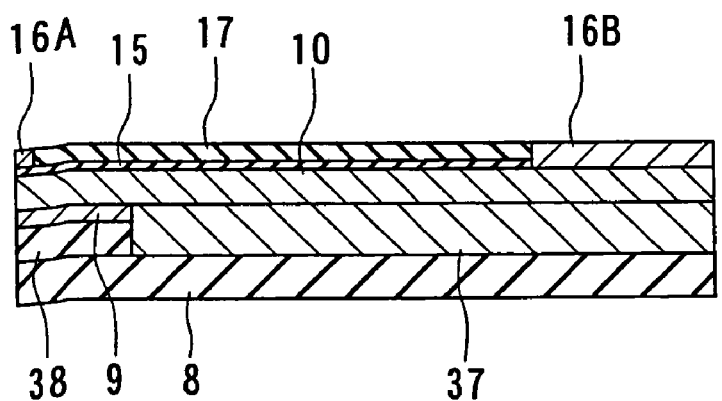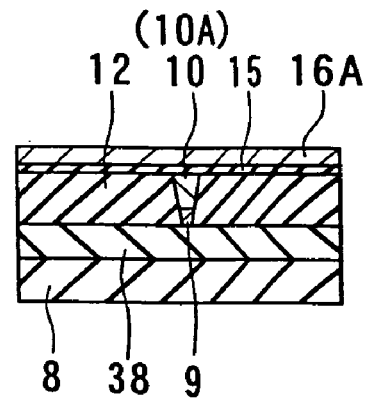
FIG. 33A  FIG. 33B

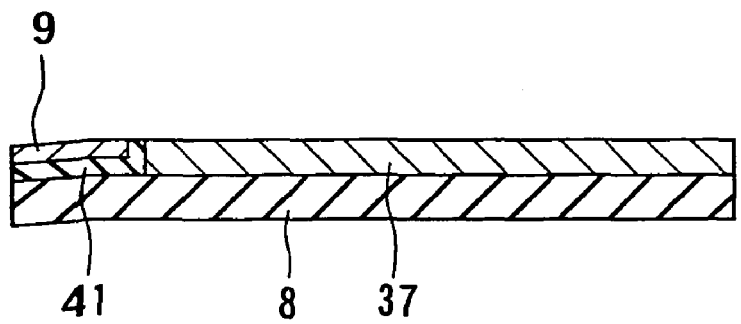 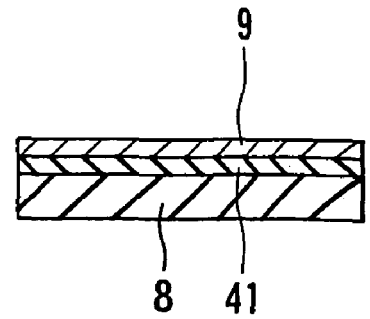
FIG. 36A   FIG. 36B
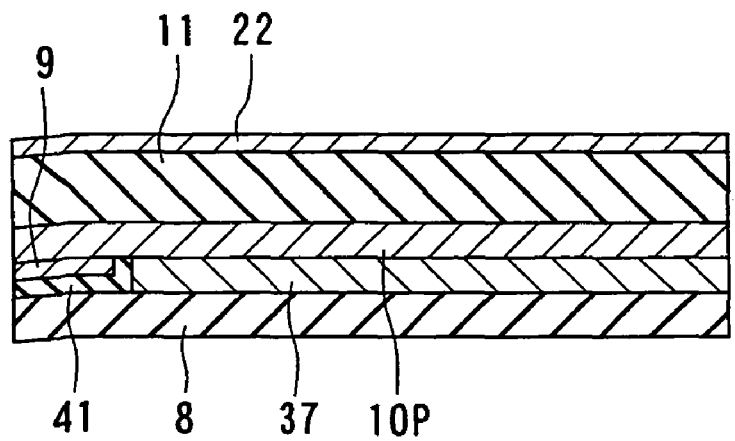 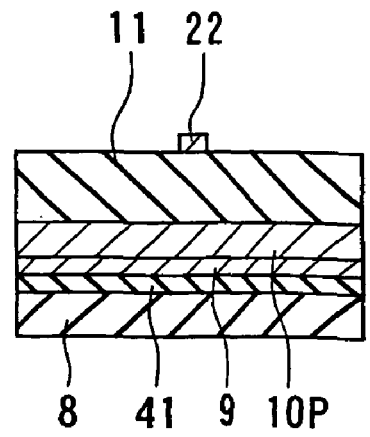
FIG. 37A   FIG. 37B

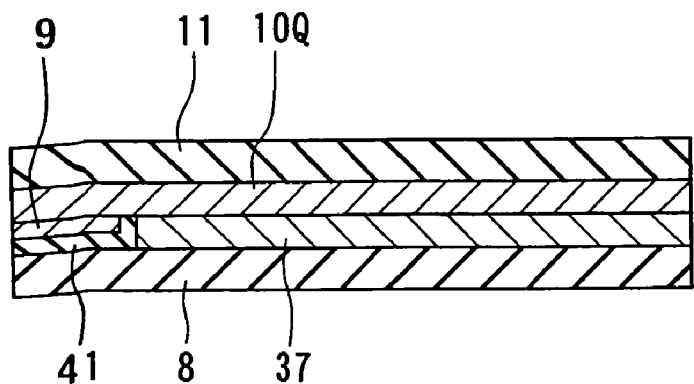
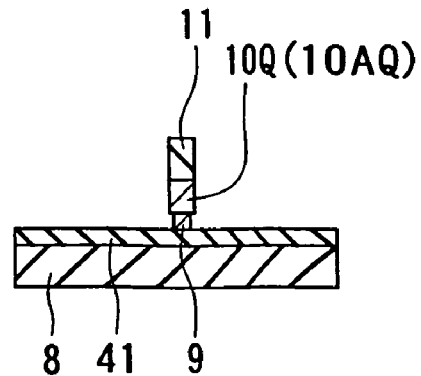
FIG. 38A  FIG. 38B
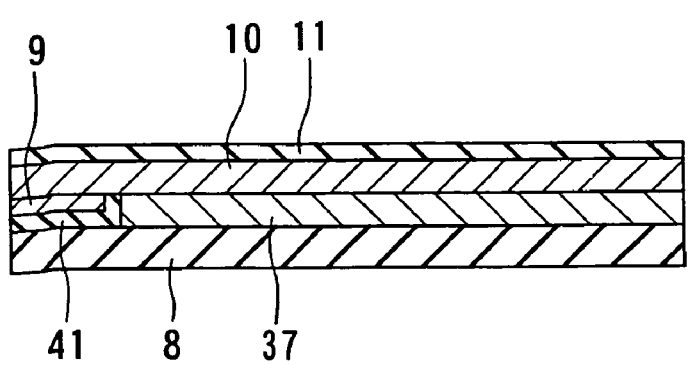
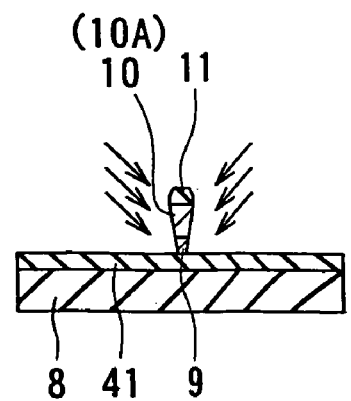
FIG. 39A  FIG. 39B

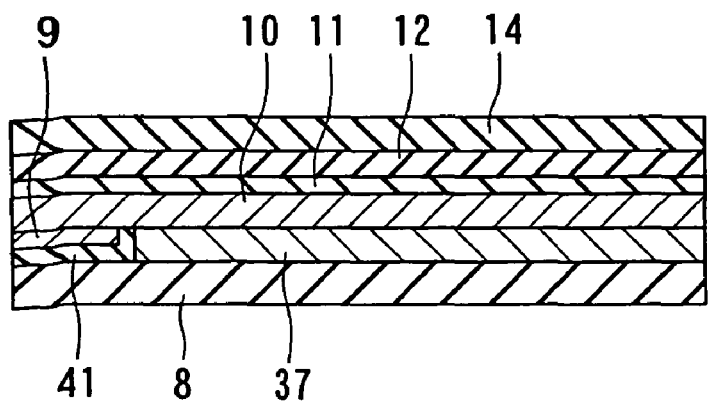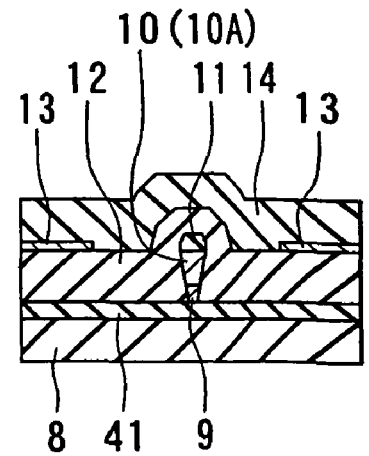
FIG. 40A          FIG. 40B
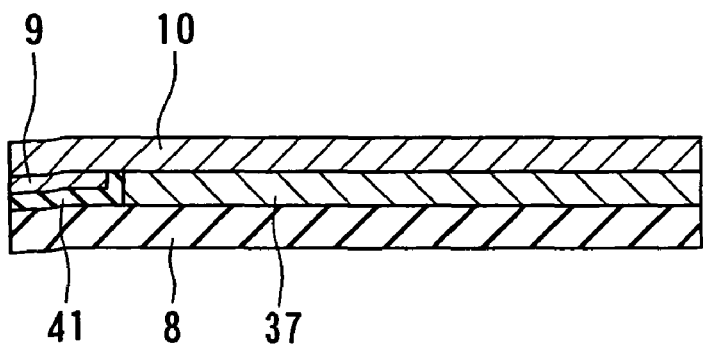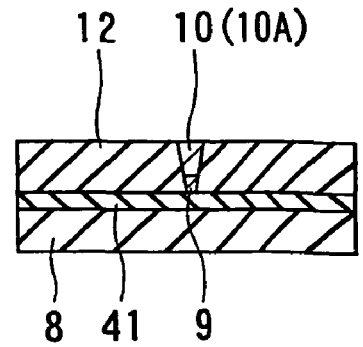
FIG. 41A          FIG. 41B

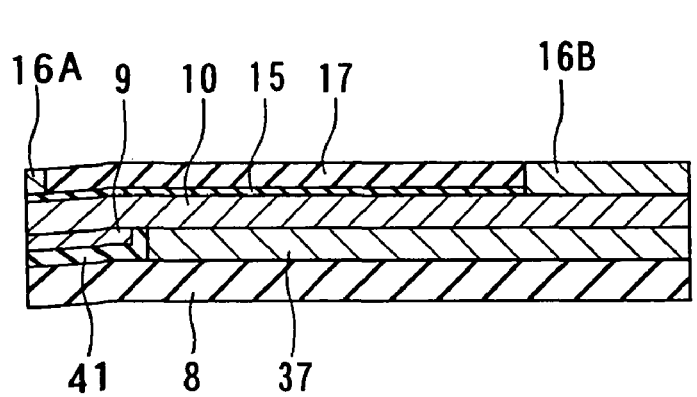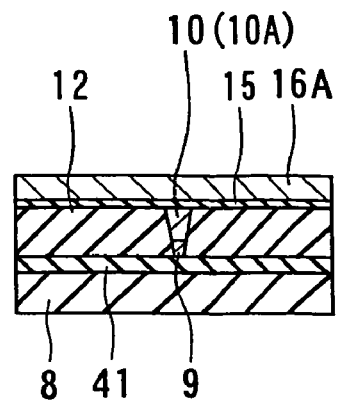
FIG. 42A  FIG. 42B
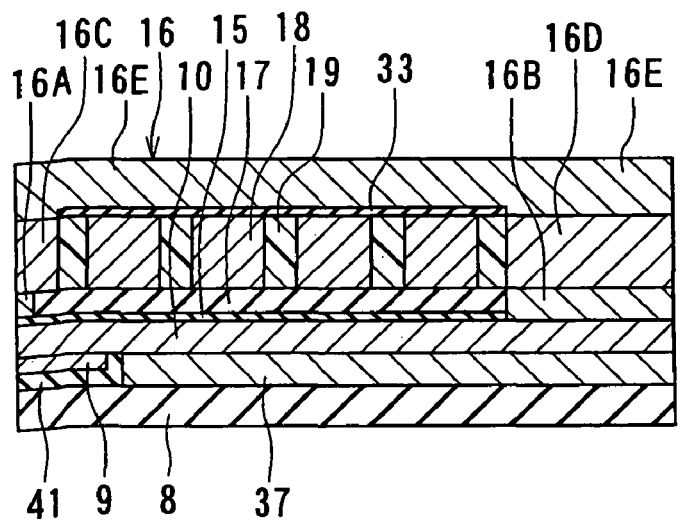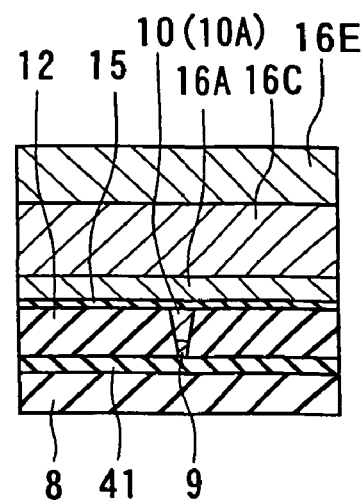
FIG. 43A  FIG. 43B

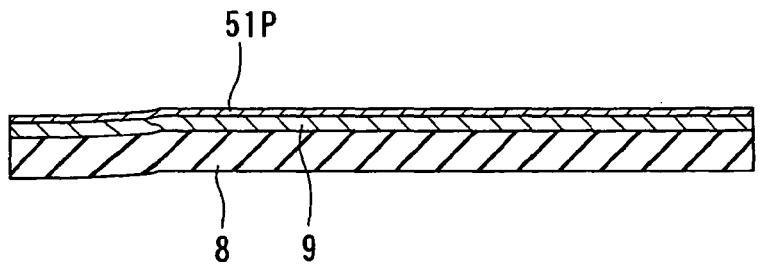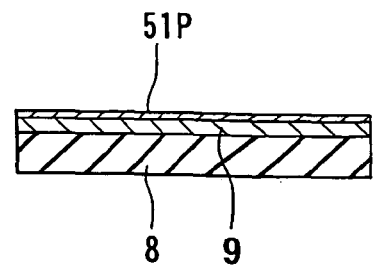
FIG. 44A
FIG. 44B
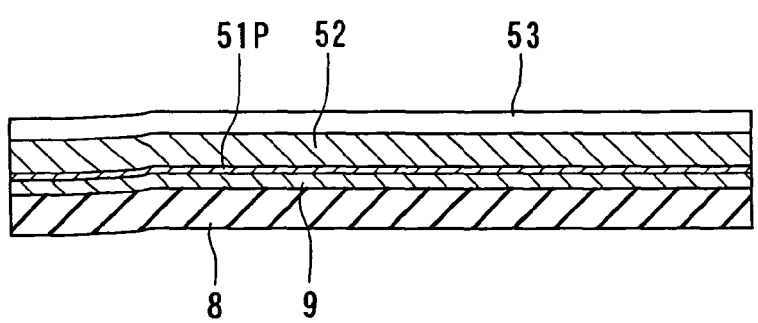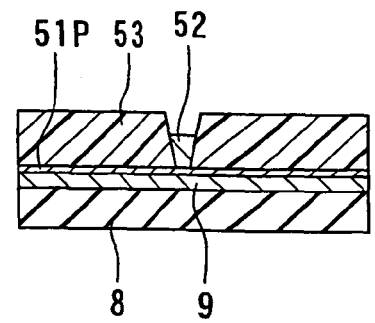
FIG. 45A
FIG. 45B
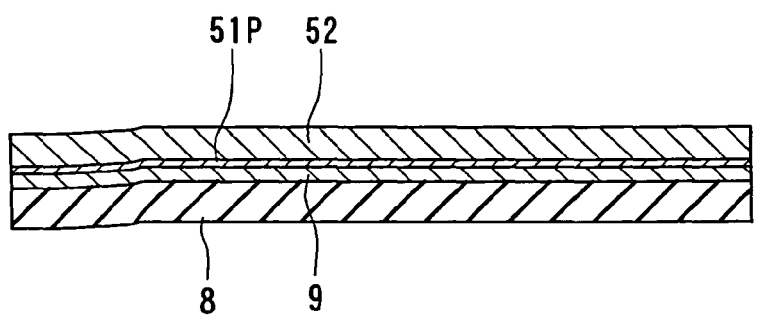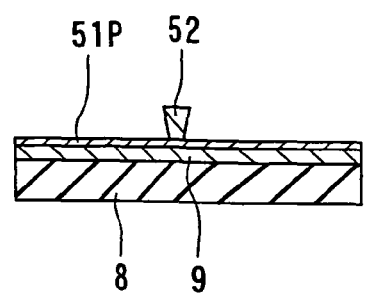
FIG. 46A
FIG. 46B

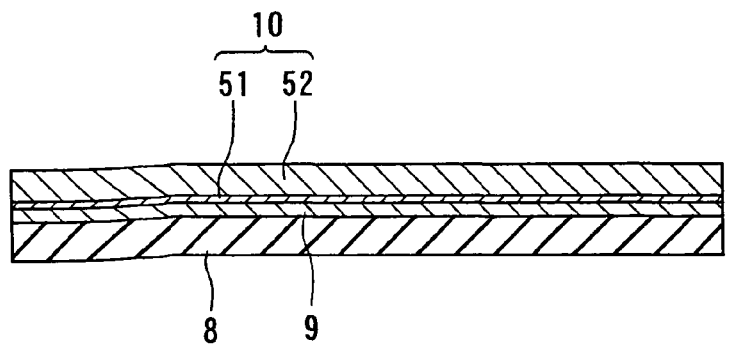
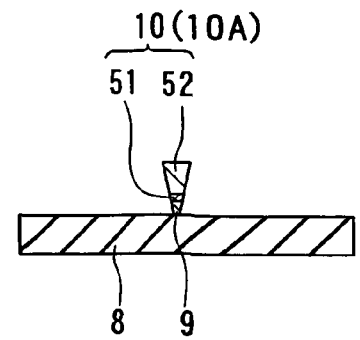
FIG. 47A  FIG. 47B
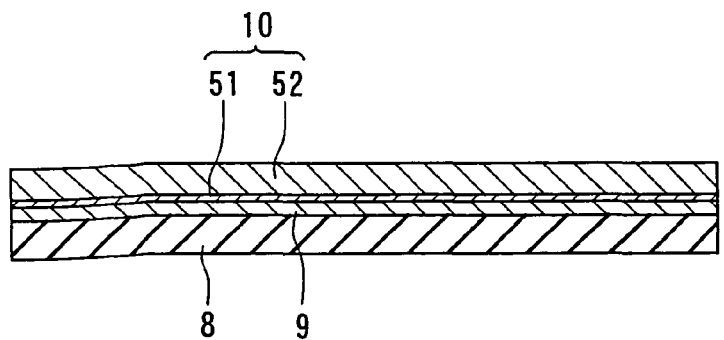
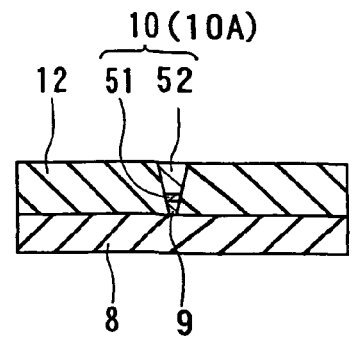
FIG. 48A  FIG. 48B

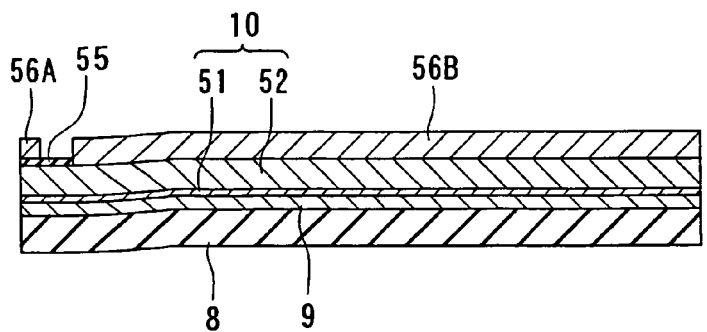
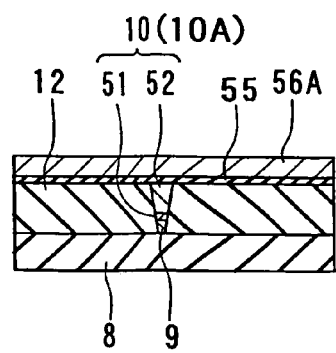
FIG. 49A          FIG. 49B
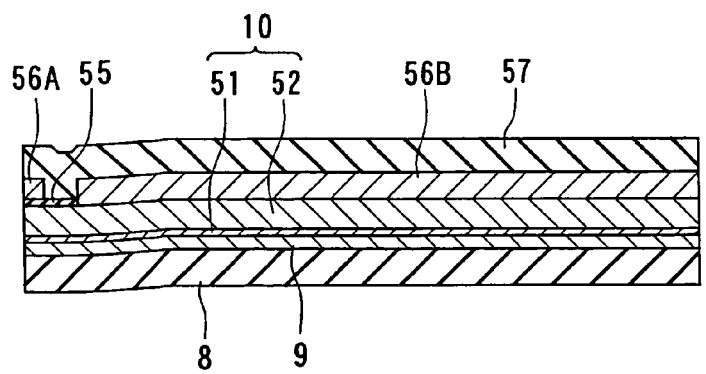
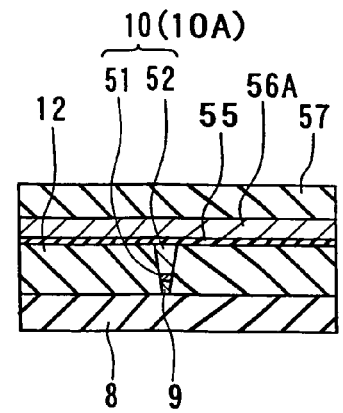
FIG. 50A          FIG. 50B

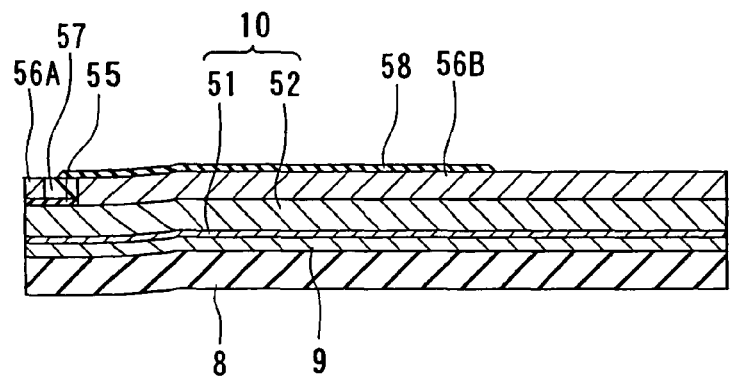
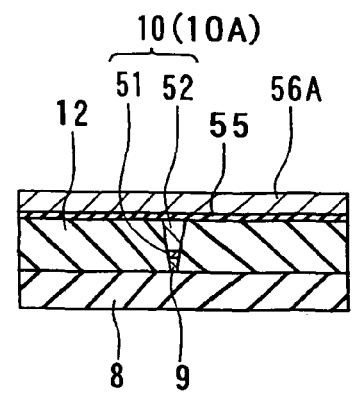
FIG. 51A  FIG. 51B
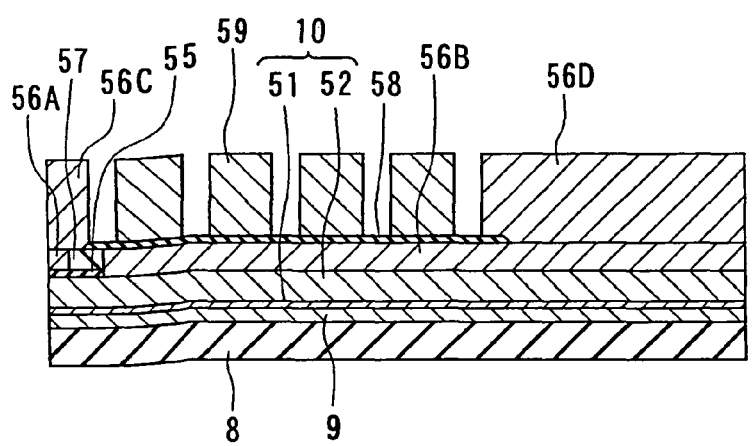
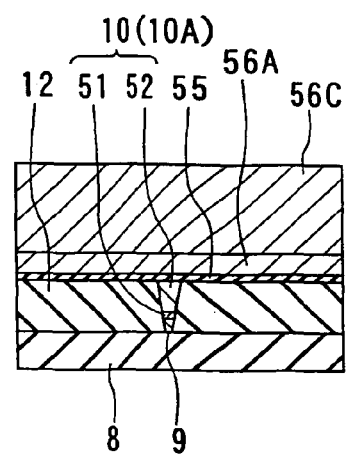
FIG. 52A  FIG. 52B

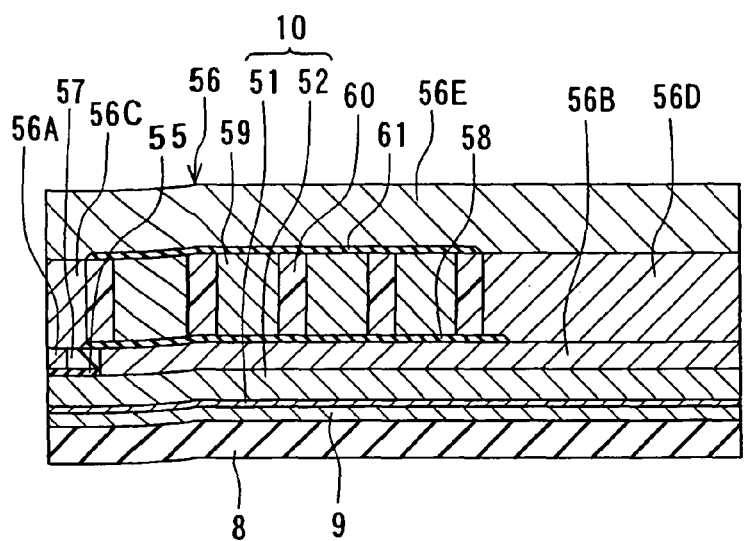 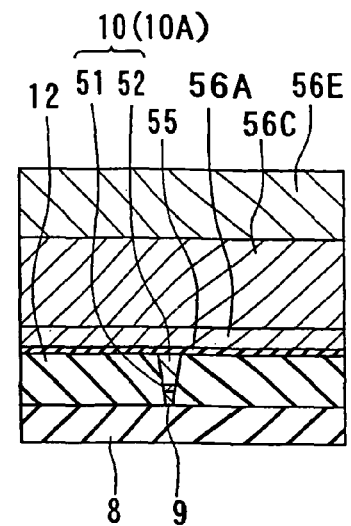
FIG. 53A  FIG. 53B
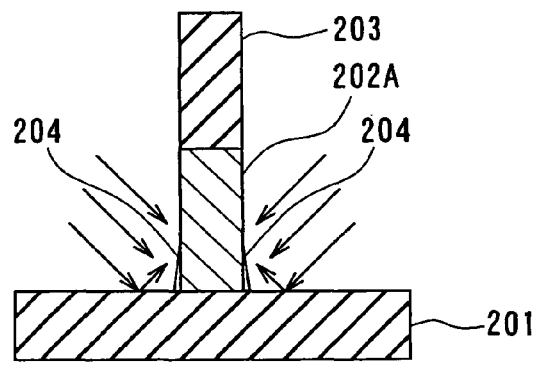
FIG. 54

METHOD OF MANUFACTURING A MAGNETIC HEAD FOR PERPENDICULAR MAGNETIC RECORDING

This is a Division of U.S. patent application Ser. No. 10/944,010 filed Sep. 20, 2004 (now U.S. Pat. No. 7,516,538). The disclosure of the prior application is hereby incorporated by reference herein in its entirety.

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850A1, the Published Unexamined Japanese Patent Application 2003-203311, and the U.S. Pat. No. 6,504,675B1, for example. According to this technique, the end of the track width defining portion located in the medium facing surface is made to have a shape in which the side located backward in the direction of travel of the recording medium (that is, the side located on the air-inflow-end side of the slider) is shorter than the other side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such that the side closer to the substrate is shorter than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head the shield prevents a magnetic flux from reaching the recording medium, the flux being generated from the end face of the pole layer and extending in directions except the direction orthogonal to the surface of the recording medium. The shield-type head achieves a further improvement in linear recording density.

Reference is now made to FIG. 54 to FIG. 56 to describe an example of a method of forming a pole layer that has a track width defining portion with an end face located in the medium facing surface and having a shape in which a side closer to the substrate is shorter than a side farther from the substrate as described above. FIG. 54 and FIG. 55 each illustrate the end face of the track width defining portion located in the medium facing surface. FIG. 56 is a top view of the pole layer.

In this method, first, a magnetic layer that will be a pole layer 202 later is formed on an insulating layer 201 made of an insulating material such as alumina ($Al_2O_3$). Next, an etching mask 203 made of alumina, for example, is formed on the magnetic layer. The etching mask 203 has a plane geometry corresponding to that of the pole layer 202 to be formed. Next, the magnetic layer is etched by dry etching such as reactive ion etching or ion beam etching, using the above-mentioned etching mask 203, so as to form the pole layer 202. In FIG. 54 to FIG. 56 numeral 202A indicates the track width defining portion of the pole layer 202. In FIG. 56 numeral 202B indicates a wide portion of the pole layer 202. ABS indicates the level at which the medium facing surface is formed. NH indicates a neck height.

Next, both side portions of the track width defining portion 202A that are opposed to each other in the direction of the track width are etched by ion beam etching wherein the direction in which ion beams move is tilted with respect to the direction orthogonal to the top surface of the insulating layer 201. Consequently, as shown in FIG. 55, the end face of the track width defining portion 202A located in the medium facing surface is made to have a shape in which the side closer to the substrate (the lower side) is shorter than the side farther from the substrate (the upper side). In FIG. 54 and FIG. 55 the arrows indicate the direction in which ion beams move.

Problems of the above-described method will now be described. First, when the side portions of the track width defining portion 202A are etched by ion beam etching, ion beams are hard to reach portions of the side portions near the bottom of the track width defining portion 202A, and the etching rate is lower in these portions than in the other portion. Moreover, when the side portions of the track width defining portion 202A are etched by ion beam etching, the insulating layer 201 is etched, too, and a substance 204 separated from the insulating layer 201 deposits on the portions of the side portions near the bottom of the track width defining portion 202A.

Because of these reasons, the progress of etching delays in the portions of the side portions of the track width defining portion 202A near the bottom of the track width defining portion 202A. Therefore, it is required to perform ion beam etching for a long period of time so as to make the end face of the track width defining portion 202A located in the medium facing surface have a shape in which the side closer to the substrate is shorter than the side farther from the substrate. However, if ion beam etching is performed for a long period, depressions may be formed in portions of the side portions of the track width defining portion 202A between the lower end and the upper end, as shown in FIG. 55. The broken line of FIG. 55 indicates a desired shape of the track width defining portion 202A. If the above-mentioned depressions are formed in the side portions of the track width defining portion 202A, the volume of the track width defining portion 202A is smaller, compared with the case in which the track width defining portion 202A has the desired shape, and the overwrite property may be thereby reduced.

The neck height NH is made greater than a desired value in some cases if ion beam etching is performed for a long period so that the end face of the track width defining portion located in the medium facing surface has a shape in which the side closer to the substrate is shorter than the side farther from the substrate. This problem will now be described, referring to FIG. 56. In FIG. 56 the broken line with numeral 202D indicates a desired location of the side portion of the wide portion 202B closer to the medium facing surface. If ion beam etching is performed for a long period, the side portion of the wide portion 202B closer to the medium facing surface is etched, too, and the location of the side portion may be farther from the medium facing surface than the desired location. Consequently, the neck height NH is made greater than a desired value. The neck height NH preferably falls within a range of 0.1 to 0.3 µm inclusive, for example, to achieve a good overwrite property. However, even if the pole layer 202 is designed to have such a shape that the neck height NH is 0.1 µm, the neck height NH may be 0.4 to 0.5 µm if ion beam etching is performed for a long period as mentioned above. As thus described, the overwrite property is reduced if the neck height NH is greater than a desired value.

Alternatively, it is possible to form the pole layer 202 by frame plating, instead of forming the pole layer 202 by etching the magnetic layer as described above. In a method of forming the pole layer 202 by frame plating, an electrode film is first formed on the insulating layer 201. Next, a photoresist layer is formed on the electrode film. The photoresist layer is then patterned to form a frame that has a groove having a shape corresponding to the pole layer 202. Next, a current is fed to the electrode film to perform plating so as to from the pole layer 202 in the groove. The frame is then removed. Next, the electrode film except the portion below the pole layer 202 is removed.

Even if the pole layer 202 is formed by frame plating, the above-described problem occurs if both side portions of the track width defining portion 202A are etched by ion beam etching so that the end face of the track width defining portion 202A located in the medium facing surface has a shape in which the side closer to the substrate is shorter than the side farther from the substrate.

Consideration may be given to form the pole layer 202 by frame plating so that the end face of the track width defining portion 202A located in the medium facing surface has a shape in which the side closer to the substrate is shorter than the side farther from the substrate. However, the following problem arises in this case, too. When the pole layer 202 is formed by frame plating, it is required that, after the pole layer 202 is formed, the electrode film except the portion below the pole layer 202 be removed. This removal of the electrode film is performed by dry etching such as ion beam etching. Both side portions of the pole layer 202 are etched, too, when the electrode film is removed. Therefore, if etching is performed to remove the electrode film for a longer period, the pole layer 202 may go out of a desired shape and/or the neck height NH may be greater than a desired value as described above.

OBJECT AND SUMMARY OF THE INVENTION

It is an object of the invention to provide a magnetic head for perpendicular magnetic recording that allows a pole layer having a shape capable of preventing problems resulting from the skew to be formed with accuracy, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer including a track width defining portion having an end face located in the medium facing surface, the pole layer allowing a magnetic flux corresponding to the field generated by the coil to pass therethrough, and generating a write magnetic field for writing the data on the recording medium through the use of a perpendicular magnetic recording system; an underlying layer disposed below the track width defining portion; and a substrate on which the underlying layer, the pole layer and the coil are stacked.

In the magnetic head of the invention, the end face of the track width defining portion located in the medium facing surface has: a first side close to the substrate; a second side located opposite to the first side; a third side connecting an end of the first side to an end of the second side; and a fourth side connecting the other end of the first side to the other end of the second side. The second side defines the track width. The end face of the track width defining portion has a width that decreases as the distance from the first side decreases. The width of the underlying layer taken in the medium facing surface is equal to or smaller than the length of the first side. The pole layer is made of a magnetic alloy including any of cobalt, iron and nickel. The underlying layer is made of a material whose etching rate of ion beam etching is higher than that of the magnetic alloy making up the pole layer.

In the magnetic head of the invention, the underlying layer disposed below the track width defining portion is made of the material whose etching rate of ion beam etching is higher than that of the magnetic alloy making up the pole layer. According to the invention, it is thereby possible to allow the pole layer having a shape capable of preventing problems resulting from the skew to be formed with accuracy.

In the magnetic head of the invention, the material of the underlying layer may contain any of Ta, Mo, W, Ti, Cr, Ni, Pd, Ru, TiW, TiN, NiCr, PtPd, and NiCu.

A magnetic head for perpendicular magnetic recording manufactured through a first or a second method of the invention comprises: a medium facing surface that faces toward a recording medium; a coil for generating a magnetic field corresponding to data to be written on the recording medium; a pole layer including a track width defining portion having an end face located in the medium facing surface, the pole layer allowing a magnetic flux corresponding to the field generated by the coil to pass therethrough, and generating a write magnetic field for writing the data on the recording medium through the use of a perpendicular magnetic recording system; and a substrate on which the pole layer and the coil are stacked.

In the magnetic head, the end face of the track width defining portion located in the medium facing surface has: a first side close to the substrate; a second side located opposite to the first side; a third side connecting an end of the first side to an end of the second side; and a fourth side connecting the other end of the first side to the other end of the second side. The second side defines a track width. The end face of the track width defining portion has a width that decreases as a distance from the first side decreases. The pole layer is made of a magnetic alloy including any of cobalt, iron and nickel.

The first method of manufacturing the magnetic head for perpendicular magnetic recording of the invention comprises the steps of: forming an underlying layer in a region in which the track width defining portion is to be disposed, the underlying layer being made of a material whose etching rate of ion beam etching is higher than that of the magnetic alloy used to make the pole layer; forming a magnetic layer including a portion to be etched that has two side surfaces and that will be formed into the track width defining portion by making the side surfaces sloped through etching, the magnetic layer being designed to be the pole layer by etching the side surfaces of the portion to be etched, wherein the magnetic layer is formed such that the portion to be etched is disposed on the underlying layer; etching the side surfaces of the portion to be etched by ion beam etching such that the magnetic layer is formed into the pole layer; and forming the coil.

According to the first method of the invention, the underlying layer exists below the portion to be etched when the side surfaces of the portion to be etched of the magnetic layer are etched by ion beam etching. The underlying layer is made of the material whose etching rate of ion beam etching is higher than that of the magnetic alloy used to make the pole layer. According to the invention, it is thereby possible to allow the pole layer having a shape capable of preventing problems resulting from the skew to be formed with accuracy.

In the first method of the invention, the step of forming the magnetic layer may include the steps of forming a layer to be patterned that is designed to be patterned to be the magnetic layer; and patterning the layer to be patterned by etching so that the layer to be patterned is formed into the magnetic layer.

In the first method of the invention, the magnetic layer may be formed by plating.

The first method of the invention may further comprise the step of patterning the underlying layer by etching the underlying layer through the use of the magnetic layer as a mask, the step being performed after the step of forming the magnetic layer and before the step of etching the side surfaces of the portion to be etched. In this case, the underlying layer patterned may have a width taken in the medium facing surface that is smaller than the width of the portion to be etched taken in the medium facing surface.

The second method of manufacturing the magnetic head for perpendicular magnetic recording of the invention comprises the steps of: forming an underlying layer in a region in which the track width defining portion is to be disposed, the underlying layer being made of a material having conductivity and whose etching rate of ion beam etching is higher than that of the magnetic alloy used to make the pole layer; forming the pole layer by plating using the underlying layer as an electrode, such that the track width defining portion is disposed on the underlying layer; removing the underlying layer except a portion below the pole layer by ion beam etching; and forming the coil.

According to the second method of the invention, the pole layer is formed by plating such that the track width defining portion is disposed on the underlying layer. Then, the underlying layer except the portion below the pole layer is removed by ion beam etching. The underlying layer is made of the material whose etching rate of ion beam etching is higher than that of the magnetic alloy used to make the pole layer. According to the invention, it is thereby possible to allow the pole layer having a shape capable of preventing problems resulting from the skew to be formed with accuracy.

In the second method of the invention, the pole layer may incorporate a first layer and a second layer disposed on the first layer. In addition, the step of forming the pole layer may include the steps of: forming an electrode film that is to be the first layer; forming a frame with a groove having a shape corresponding to the second layer on the electrode film; forming the second layer in the groove of the frame by plating using the underlying layer and the electrode film as electrodes; removing the frame after the second layer is formed; and forming the first layer by removing the electrode film except a portion below the second layer by ion beam etching.

In the second method of the invention, two side surfaces of the track width defining portion may be etched by ion beam etching, too, in the step of removing the underlying layer.

In the first or second method of the invention, the material of the underlying layer may contain any of Ta, Mo, W, Ti, Cr, Ni, Pd, Ru, TiW, TiN, NiCr, PtPd, and NiCu.

According to the magnetic head for perpendicular magnetic recording or the method of manufacturing the same of the invention, the track width defining portion of the pole layer is disposed on the underlying layer. The underlying layer is made of the material whose etching rate of ion beam etching is higher than that of the magnetic alloy making up the pole layer. According to the invention, it is thereby possible to allow the pole layer having a shape capable of preventing problems resulting from the skew to be formed with accuracy.

Other and further objects, features and advantages of the invention will appear more fully from the following description.

BRIEF DESCRIPTION OF THE DRAWINGS

FIG. 3 is a top view of the pole layer of the magnetic head of the first embodiment of the invention.

FIG. 4A and FIG. 4B are views for illustrating a step of a method of manufacturing the magnetic head of the first embodiment of the invention.

FIG. 5A and FIG. 5B are views for illustrating a step that follows the step shown in FIG. 4A and FIG. 4B.

FIG. 6A and FIG. 6B are views for illustrating a step that follows the step shown in FIG. 5A and FIG. 5B.

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

FIG. 9A and FIG. 9B are views for illustrating a step that follows the step shown in FIG. 8A and FIG. 8B.

FIG. 10A and FIG. 10B are views for illustrating a step that follows the step shown in FIG. 9A and FIG. 9B.

FIG. 20A and FIG. 20B are views for illustrating a step that follows the step shown in FIG. 19A and FIG. 19B.

FIG. 21A and FIG. 21B are views for illustrating a step that follows the step shown in FIG. 20A and FIG. 20B.

FIG. 22A and FIG. 22B are views for illustrating a step that follows the step shown in FIG. 21A and FIG. 21B.

FIG. 23A and FIG. 23B are views for illustrating a step that follows the step shown in FIG. 22A and FIG. 22B.

FIG. 24A and FIG. 24B are views for illustrating a step that follows the step shown in FIG. 23A and FIG. 23B.

FIG. 25A and FIG. 25B are views for illustrating a step that follows the step shown in FIG. 24A and FIG. 24B.

FIG. 26A and FIG. 26B are views for illustrating a step of a method of manufacturing a magnetic head of a third embodiment of the invention.

FIG. 27A and FIG. 27B are views for illustrating a step that follows the step shown in FIG. 26A and FIG. 26B.

FIG. 30A and FIG. 30B are views for illustrating a step that follows the step shown in FIG. 29A and FIG. 29B.

FIG. 31A and FIG. 31B are views for illustrating a step that follows the step shown in FIG. 30A and FIG. 30B.

FIG. 32A and FIG. 32B are views for illustrating a step that follows the step shown in FIG. 31A and FIG. 31B.

FIG. 33A and FIG. 33B are views for illustrating a step that follows the step shown in FIG. 32A and FIG. 32B.

FIG. 36A and FIG. 36B are views for illustrating a step that follows the step shown in FIG. 35A and FIG. 35B.

FIG. 37A and FIG. 37B are views for illustrating a step that follows the step shown in FIG. 36A and FIG. 36B.

FIG. 38A and FIG. 38B are views for illustrating a step that follows the step shown in FIG. 37A and FIG. 37B.

FIG. 39A and FIG. 39B are views for illustrating a step that follows the step shown in FIG. 38A and FIG. 38B.

FIG. 40A and FIG. 40B are views for illustrating a step that follows the step shown in FIG. 39A and FIG. 39B.

FIG. 41A and FIG. 41B are views for illustrating a step that follows the step shown in FIG. 40A and FIG. 40B.

FIG. 42A and FIG. 42B are views for illustrating a step that follows the step shown in FIG. 41A and FIG. 41B.

FIG. 43A and FIG. 43B are views for illustrating a step shown in FIG. 42A and FIG. 42B.

FIG. 44A and FIG. 44B are views for illustrating a step of a method of manufacturing a magnetic head of a fifth embodiment of the invention.

FIG. 45A and FIG. 45B are views for illustrating a step that follows the step shown in FIG. 44A and FIG. 44B.

FIG. 46A and FIG. 46B are views for illustrating a step that follows the step shown in FIG. 45A and FIG. 45B.

FIG. 47A and FIG. 47B are views for illustrating a step that follows the step shown in FIG. 46A and FIG. 46B.

FIG. 48A and FIG. 48B are views for illustrating a step that follows the step shown in FIG. 47A and FIG. 47B.

FIG. 49A and FIG. 49B are views for illustrating a step that follows the step shown in FIG. 48A and FIG. 48B.

FIG. 50A and FIG. 50B are views for illustrating a step that follows the step shown in FIG. 49A and FIG. 49B.

FIG. 51A and FIG. 51B are views for illustrating a step that follows the step shown in FIG. 50A and FIG. 50B.

FIG. 52A and FIG. 52B are views for illustrating a step that follows the step shown in FIG. 51A and FIG. 51B.

FIG. 53A and FIG. 53B are views for illustrating a step that follows the step shown in FIG. 52A and FIG. 52B.

FIG. 54 is a cross-sectional view for illustrating an example of a method of forming a pole layer.

DETAILED DESCRIPTION OF THE PREFERRED EMBODIMENTS

First Embodiment

Figure 1:
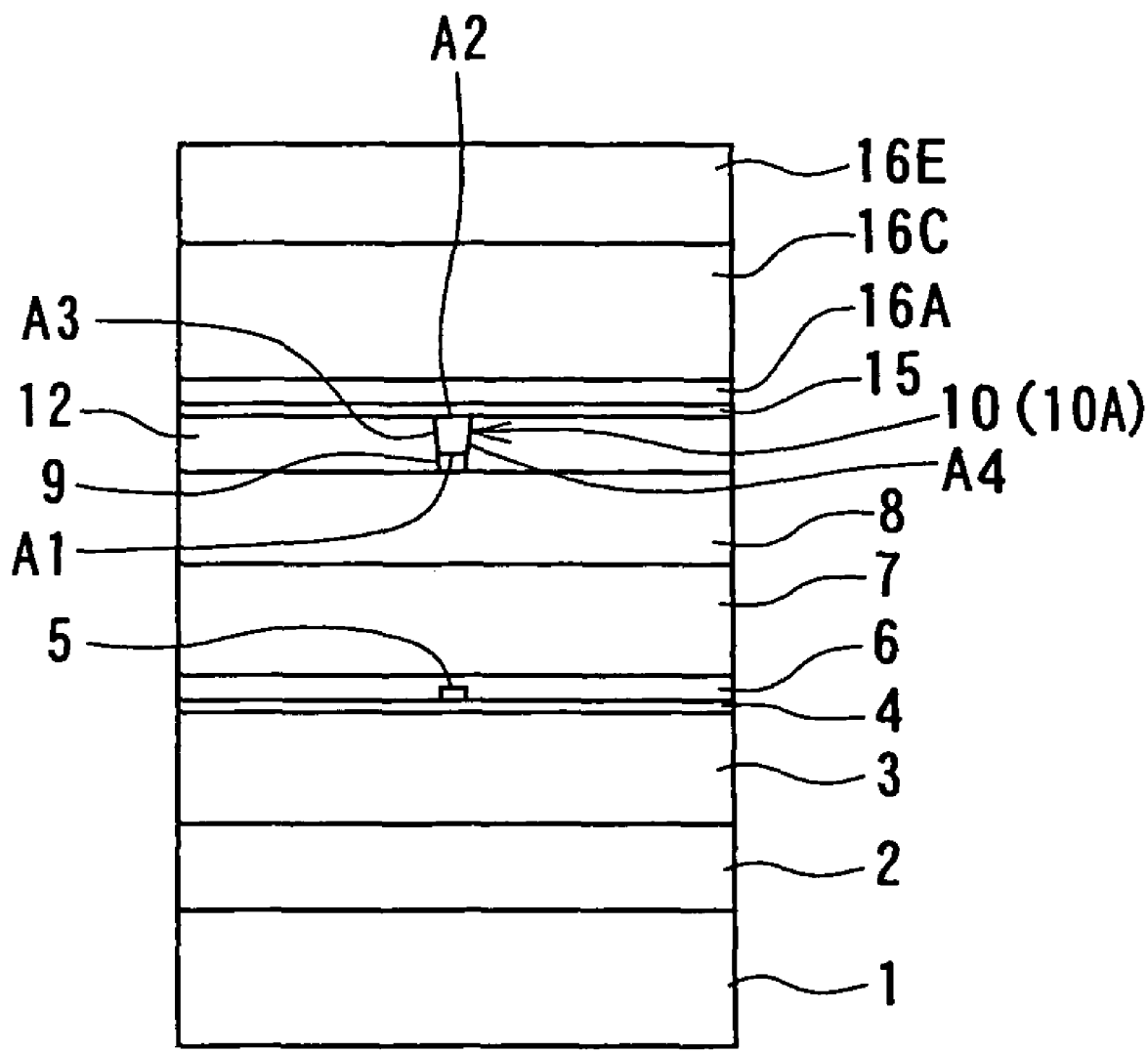
FIG. 1 is a front view of the medium facing surface of a magnetic head of a first embodiment of the invention.
Figure 2:
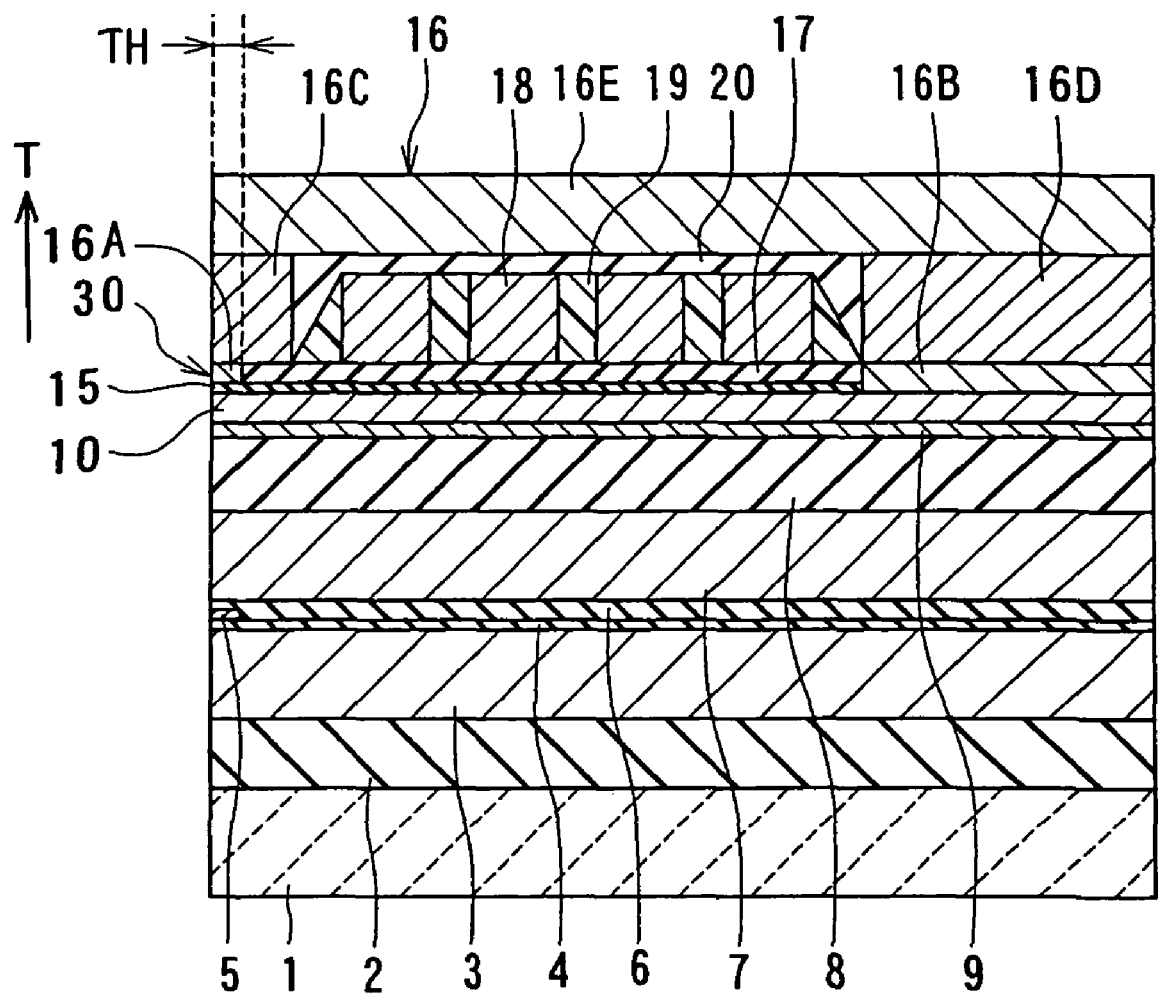
FIG. 2 is a cross-sectional view for illustrating the configuration of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a front view for illustrating the medium facing surface of the magnetic head of the embodiment. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material such as alumina and disposed on the top shield layer 7; an underlying layer 9 formed on the insulating layer 8; a pole layer 10 made of a magnetic material and disposed on the underlying layer 9; and a nonmagnetic layer 12 made of a nonmagnetic material such as alumina and disposed around the underlying layer 9 and the pole layer 10.

The pole layer 10 is made of a magnetic alloy including any of cobalt, iron and nickel. In the embodiment the pole layer 10 is made of CoFeN by way of example. The underlying layer 9 is made of a material whose etching rate of ion beam etching is higher, compared with the magnetic alloy making up the pole layer 10. It is also noted that the material of the underlying layer 9 is the one whose etching rate of ion beam etching is higher, compared with the insulating material making up the insulating layer 8, such as alumina. It is further noted that the material of the underlying layer 9 is the one that makes the amount of substance depositing on the other layers during ion beam etching smaller, compared with the insulating material making up the insulating layer 8, such as alumina. To be specific, the material of the underlying layer 9 contains any of Ta, Mo, W, Ti, Cr, Ni, Pd, Ru, TiW, TiN, NiCr, PtPd, and NiCu, for example.

The magnetic head further comprises a gap layer 15 disposed on the top surfaces of the pole layer 10 and the nonmagnetic layer 12. The gap layer 15 has an opening located at a distance from the medium facing surface. The gap layer 15 may be made of an insulating material such as alumina or may be made of a nonmagnetic metal material such as Ru, NiCu, Ta, W or NiB.

The magnetic head further comprises a shield layer 16 made of a magnetic material. The shield layer 16 has: a first layer 16A disposed on the gap layer 15; a second layer 16C disposed on the first layer 16A; a coupling layer 16B disposed on a portion of the pole layer 10 where the opening of the gap layer 15 is formed; a coupling layer 16D disposed on the coupling layer 16B; and a third layer 16E disposed to couple the second layer 16C to the coupling layer 16D. The layers 16A to 16E are made of NiFe or CoNiFe, for example.

The magnetic head further comprises a nonmagnetic layer 17 made of a nonmagnetic material and disposed around the coupling layer 16B. A portion of the nonmagnetic layer 17 is disposed on a side of the first layer 16A. The nonmagnetic layer 17 is made of an inorganic insulating material such as alumina or coating glass. Alternatively, the nonmagnetic layer 17 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: a coil 18 disposed on the nonmagnetic layer 17; an insulating layer 19 covering the coil 18; and an insulating layer 20 covering the coil 18 and the insulating layer 19. The coil 18 is flat-whorl-shaped. Part of the coil 18 passes between the second layer 16C and the coupling layer 16D. The coil 18 is made of a conductive material such as copper. The insulating layer 19 is made of photoresist, for example. The insulating layer 20 is made of alumina, for example. The second layer 16C, the coupling layer 16D and the insulating layer 20 have flattened top surfaces. The third layer 16E is formed on the flattened top surfaces of the second layer 16C, the coupling layer 16D and the insulating layer 20.

The portion from the underlying layer 9 to the third layer 16E of the shield layer 16 make up the write head. Although not shown, the magnetic head further comprises a protection layer for covering the shield layer 16.

As described so far, the magnetic head of the embodiment comprises the medium facing surface 30 that faces toward a recording medium, the read head, and the write head. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the underlying layer 9, the pole layer 10, the nonmagnetic layer 12, the gap layer 15, the shield layer 16, the nonmagnetic layer 17, the coil 18, and the insulating layers 19 and 20. The coil 18 generates a magnetic field corresponding to data to be written on the recording medium.

FIG. 3 is a top view of the pole layer 10. The pole layer 10 allows a magnetic flux corresponding to the field generated by the coil 18 to pass therethrough and generates a write magnetic field for writing data on a recording medium by using the perpendicular magnetic recording system. As shown in FIG. 3, the pole layer 10 incorporates a track width defining portion 10A and a wide portion 10B. The track width defining portion 10A has an end located in the medium facing surface 30 and has a uniform width. The wide portion 10B is coupled to the other end of the track width defining portion 10A and has a width greater than the width of the track width defining portion 10A. The wide portion 10B is equal in width to the track width defining portion 10A at the interface with the track width defining portion 10A, and gradually increases in width as the distance from the medium facing surface 30 increases and then maintains a specific width to the end of the wide portion 10B. Here, the length of the track width defining portion 10A orthogonal to the medium facing surface 30 is called a neck height NH. The neck height NH falls within a range of 0.1 to 0.3 μm inclusive, for example. FIG. 3 illustrates the state before the medium facing surface 30 is formed. ABS of FIG. 3 indicates the location to be the medium facing surface 30 later.

The shield layer 16 has an end located in the medium facing surface 30 and has a portion away from the medium facing surface 30 that is coupled to the pole layer 10. The gap layer 15 is made of a nonmagnetic material and provided between the pole layer 10 and the shield layer 16.

In the medium facing surface 30, the end face of the shield layer 16 is disposed forward of the end face of the pole layer 10 along the direction T of travel of the recording medium with a specific space created by the thickness of the gap layer 15. At least part of the coil 18 is disposed between the pole layer 10 and the shield layer 16 and insulated from the pole layer 10 and the shield layer 16.

The shield layer 16 has: the first layer 16A disposed adjacent to the gap layer 15; the second layer 16C disposed on a side of the first layer 16A farther from the gap layer 15; the coupling layers 16B and 16D disposed on the portion of the pole layer 10 where the opening of the gap layer 15 is formed; and the third layer 16E disposed to couple the second layer 16C to the coupling layer 16D. The second layer 16C is disposed between the medium facing surface 30 and the at least part of the coil 18.

As shown in FIG. 1, the track width defining portion 10A of the pole layer 10 has an end face located in the medium facing surface 30. The end face of the track width defining portion 10A located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the track width defining portion 10A located in the medium facing surface 30 decreases as the distance from the first side A1 decreases. The width of the underlying layer 9 taken in the medium facing surface 30 is equal to or smaller than the length of the first side A1.

The length of the second side A2, that is, the track width, falls within a range of 0.1 to 0.15 μm inclusive, for example. The thickness of the pole layer 10 falls within a range of 0.2 to 0.4 μm inclusive, for example. Each of the third side A3 and the fourth side A4 forms an angle that falls within a range of 5 to 12 degrees inclusive, for example, with respect to the direction orthogonal to the top surface of the substrate 1. The thickness of the underlying layer 9 falls within a range of 0.03 to 0.1 μm inclusive, for example. The thickness of the gap layer 15 falls within a range of 50 to 70 nm inclusive, for example.

The first layer 16A of the shield layer 16 has a first end located in the medium facing surface 30 and a second end opposite to the first end. The second layer 16C of the shield layer 16 also has a first end located in the medium facing surface 30 and a second end opposite to the first end. The outermost end of the coil 18 has a shape of circular arc protruding toward the medium facing surface 30. Each of the second end of the first layer 16A and the second end of the second layer 16C has a shape of circular arc along the outermost end of the coil 18.

The second end of the first layer 16A defines the throat height TH. That is, as shown in FIG. 2, the throat height TH is the minimum distance between the first end and the second end of the portion of the first layer 16A facing toward the pole layer 10 with the gap layer 15 disposed in between. The throat height TH falls within a range of 0.1 to 0.3 μm inclusive, for example. The minimum distance between the first end and the second end of the portion of the second layer 16C facing toward the pole layer 10 with the gap layer 15 and the first layer 16A disposed in between falls within a range of 0.5 to 0.8 μm inclusive, for example. The first layer 16A and the coupling layer 16B have a thickness that falls within a range of 0.3 to 0.5 μm inclusive, for example. The second layer 16C and the coupling layer 16D have a thickness that falls within a range of 3.0 to 3.5 μm inclusive, for example. The third layer 16E has a thickness that falls within a range of 1.5 to 2.5 μm inclusive, for example.

As shown in FIG. 2, the nonmagnetic layer 17 is disposed on a side of the first layer 16A. The nonmagnetic layer 17 has a thickness that is equal to or greater than the thickness of the first layer 16A and that falls within a range of 0.3 to 0.5 μm inclusive, for example. At least part of the coil 18 is disposed on the nonmagnetic layer 17. The coil 18 has a thickness that is equal to or smaller than the thickness of the second layer 16C and that falls within a range of 2.5 to 3.5 μm inclusive, for example. The at least part of the coil 18 is disposed on a side of the nonmagnetic layer 17 opposite to the pole layer 10 and in a region farther from the pole layer 10 than a surface (the top surface) of the first layer 16A opposite to the pole layer 10.

Reference is now made to FIG. 4A to FIG. 12A and FIG. 4B to FIG. 12B to describe a method of manufacturing the magnetic head of the embodiment. FIG. 4A to FIG. 12A are cross sections of layered structures obtained through the manufacturing process of the magnetic head, the cross sections being orthogonal to the medium facing surface and the substrate. FIG. 4B to FIG. 12B are cross sections of portions of the layered structures near the medium facing surface that are parallel to the medium facing surface. Portions closer to the substrate 1 than the insulating layer 8 are omitted in FIG. 4A to FIG. 12A and FIG. 4B to FIG. 12B.

According to the method of manufacturing the magnetic head of the embodiment, as shown in FIG. 2, the insulating layer 2, the bottom shield layer 3 and the bottom shield gap film 4 are formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6.

FIG. 4A and FIG. 4B illustrate the following step. In the step, first, the underlying layer 9 having a thickness of 0.1 μm, for example, is formed by sputtering, for example, on the insulating layer 8. Next, a layer 10P to be patterned that will be finally the pole layer 10 is formed on the underlying layer 9 by sputtering, for example. The layer 10P is made of a magnetic alloy including any of cobalt, iron and nickel. In the embodiment the layer 10P is made of CoFeN by way of example. The layer 10P has a thickness that falls within a range of 0.2 to 0.4 μm inclusive, for example.

Next, an alumina layer 11 having a thickness of 1.2 μm, for example, is formed by sputtering, for example, on the layer 10P. Next, an etching mask 22 made of CoFe or CoNiFe, for example, and having a thickness of 0.3 to 0.6 μm, for example, is formed by frame plating on the alumina layer 11.

The mask 22 has a plane geometry corresponding to that of the pole layer 10 to be formed.

Next, as shown in FIG. 5A and FIG. 5B, the alumina layer 11 is selectively etched, using the mask 22. Etching of the alumina layer 11 is performed by reactive ion etching, for example.

FIG. 6A and FIG. 6B illustrate the following step. In the step, first, the layer 10P is selectively etched, using the portion of the alumina layer 11 remaining after the etching as a mask. Through this etching, the layer 10P is patterned to be a magnetic layer 10Q that will be the pole layer 10 later. The magnetic layer 10Q includes a portion 10AQ to be etched that will be formed into the track width defining portion 10A by etching both side surfaces of the portion 10AQ to form sloped surfaces.

The etching of the layer 10P is performed by reactive ion etching or ion beam etching, for example. If the layer 10P is etched by reactive ion etching, it is preferred to use an etching gas containing a halogen gas and an additive gas such as $O_2$, $CO_2$, $N_2$ or $H_2$. The halogen gas may be $Cl_2$ or a gas containing $Cl_2$ and $BCl_3$. The etching is preferably performed at a temperature that falls within a range of 140 to 250° C. inclusive.

Next, the underlying layer 9 is selectively etched, using the magnetic layer 10Q as a mask, and patterned. Etching of the underlying layer 9 is also performed by reactive ion etching or ion beam etching, for example.

Next, as shown in FIG. 7A and FIG. 7B, the underlying layer 9 is over-etched by reactive ion etching, for example. As shown in FIG. 7B, the underlying layer 9 patterned by this etching has a width taken in the medium facing surface 30 that is smaller than the width of the portion 10AQ taken in the medium facing surface 30. The conditions for etching the underlying layer 9 by reactive ion etching may be the same as the conditions for etching the layer 10P. The step illustrated in FIG. 7A and FIG. 7B may be omitted.

FIG. 8A and FIG. 8B illustrate the following step. In the step both side surfaces of the portion 10AQ are etched by ion beam etching to make the side surfaces of the portion 10AQ sloped, so that the width of the bottom surface of the portion 10AQ is smaller than the width of the top surface of the portion 10AQ. To be specific, each of the side surfaces of the portion 10AQ forms an angle that falls within a range of 5 to 12 degrees inclusive, for example, with respect to the direction orthogonal to the top surface of the substrate 1. This etching may be performed such that the direction in which ion beams move forms an angle of 40 to 50 degrees with respect to the direction orthogonal to the top surface of the substrate 1. Through this step, both side surfaces of the portion 10AQ are sloped by etching, so that the portion 10AQ becomes the track width defining portion 10A and the magnetic layer 10Q becomes the pole layer 10.

FIG. 9A and FIG. 9B illustrate the following step. In the step, first, the nonmagnetic layer 12 having a thickness equal to the total thickness of the underlying layer 9 and the pole layer 10 is formed on the entire top surface of the layered structure. Next, a stopper film 13 having a thickness of 10 to 20 nm, for example, is formed on the nonmagnetic layer 12 except a region near the pole layer 10. The stopper film 13 may be made of a nonmagnetic refractory metal such as Ta, Ru or W. Next, an insulating film 14 made of alumina, for example, and having a thickness of 0.3 to 0.8 µm, for example, is formed on the entire top surface of the layered structure.

FIG. 10A and FIG. 10B illustrate the following step. In the step, first, the insulating film 14 and the nonmagnetic layer 12 are polished by chemical mechanical polishing (hereinafter referred to as CMP), for example. This polishing is stopped when the stopper film 13 is exposed. Next, the stopper film 13 is removed by reactive ion etching or wet etching, for example. The top surface of the nonmagnetic layer 12 is thereby exposed. Next, the top surfaces of the nonmagnetic layer 12 and the insulating film 14 are slightly polished by CMP, for example, to expose the top surface of the pole layer 10 and to flatten the top surfaces of the pole layer 10 and the nonmagnetic layer 12. The thickness of the pole layer 10 is thereby controlled to be of a desired value.

Figure 11A:
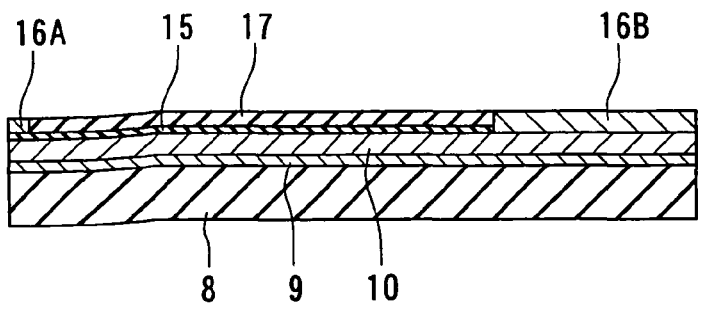
FIG. 11A and FIG. 11B are views for illustrating a step that follows the step shown in FIG. 10A and FIG. 10B.
Figure 11B:
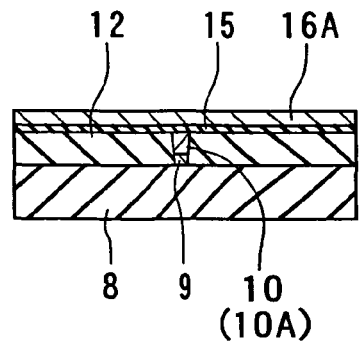

FIG. 11A and FIG. 11B illustrate the following step. In the step, first, the gap layer 15 is formed on the entire top surface of the layered structure. Next, a portion of the gap layer 15 away from the medium facing surface 30 is selectively etched to form an opening in the gap layer 15. Next, the first layer 16A is formed on the gap layer 15, and the coupling layer 16B is formed on a portion of the pole layer 10 where the opening of the gap layer 15 is formed. The first layer 16A and the coupling layer 16B may be formed by frame plating or by making a magnetic layer through sputtering and selectively etching the magnetic layer. Next, the nonmagnetic layer 17 is formed by sputtering, for example, on the entire top surface of the layered structure. Next, the nonmagnetic layer 17 is polished by CMP, for example, so that the first layer 16A and the coupling layer 16B are exposed, and the top surfaces of the first layer 16A, the coupling layer 16B and the nonmagnetic layer 17 are flattened.

Figure 12A:
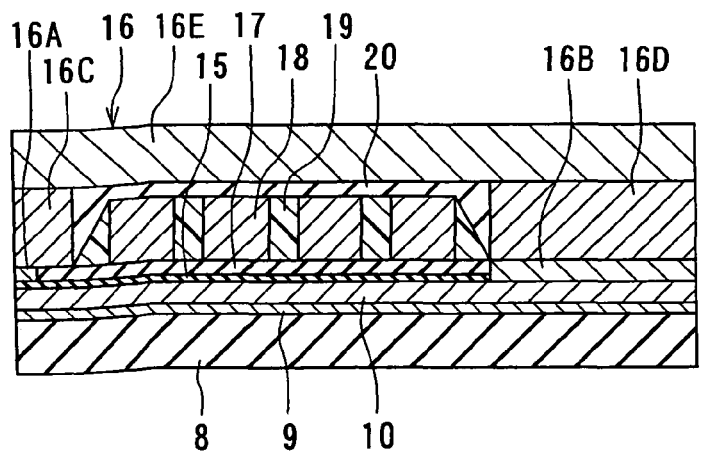
FIG. 12A and FIG. 12B are views for illustrating a step that follows the step shown in FIG. 11A and FIG. 11B.
Figure 12B:
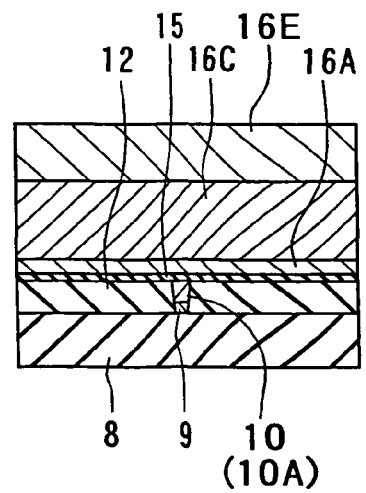

FIG. 12A and FIG. 12B illustrate the following step. In the step, first, the coil 18 is formed by frame plating, for example, such that at least part of the coil 18 is disposed on the nonmagnetic layer 17. Next, the second layer 16C and the coupling layer 16D are formed by frame plating, for example. Alternatively, the coil 18 may be formed after the second layer 16C and the coupling layer 16D are formed. Next, the insulating layer 19 made of photoresist, for example, is selectively formed to cover the coil 18. Next, the insulating layer 20 made of alumina, for example, and having a thickness of 3 to 5 µm, for example, is formed on the entire top surface of the layered structure. Next, the insulating layer 20 is polished by CMP, for example, so that the second layer 16C and the coupling layer 16D are exposed, and the top surfaces of the second layer 16C, the coupling layer 16D and the insulating layer 20 are thereby flattened. Next, the third layer 16E is formed by frame plating, for example, to complete the shield layer 16.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 18 generates a magnetic field that corresponds to the data to be written on the medium. The pole layer 10 and the shield layer 16 form a magnetic path through which a magnetic flux corresponding to the magnetic field generated by the coil 18 passes. The pole layer 10 allows the flux corresponding to the field generated by the coil 18 to pass and generates a write magnetic field used for writing the data on the medium through the use of the perpendicular magnetic recording system. The shield layer 16 takes in a disturbance magnetic field applied from outside the magnetic head to the magnetic head. It is thereby possible to prevent erroneous writing on the recording medium caused by the disturbance magnetic field intensively taken in into the pole layer 10.

According to the embodiment, in the medium facing surface 30, the end face of the shield layer 16 is disposed forward of the end face of the pole layer 10 along the direction T of travel of the recording medium (that is, on the air-outflow-end side of the slider) with a specific small space created by the gap layer 15. The location of an end of the bit pattern written on the recording medium is determined by the location of the gap-layer-15-side end of the end face of the pole layer 10 located in the medium facing surface 30. The shield layer 16 takes in a magnetic flux generated from the end face of the pole layer 10 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 1, the end face of the pole layer 10 located in the medium facing surface 30 has a width that decreases as the distance from the first side A1 decreases. It is thereby possible to prevent the problems resulting from the skew.

Figure 13:
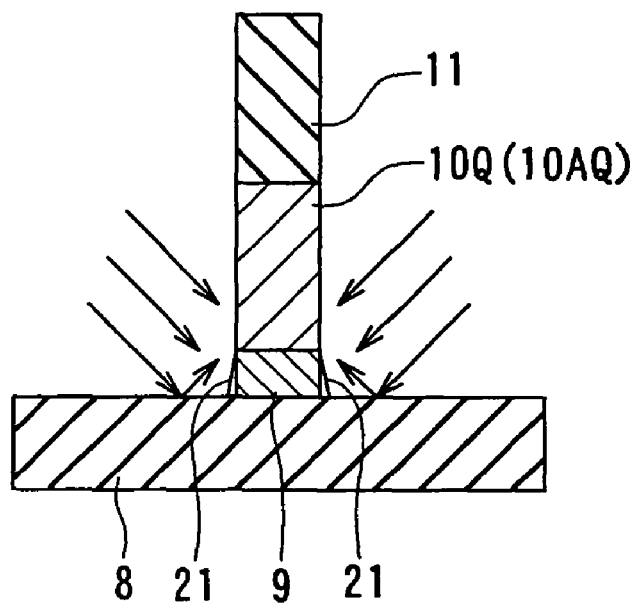
FIG. 13 is a cross-sectional view for illustrating the step shown in FIG. 6A and FIG. 6B.
Figure 14:
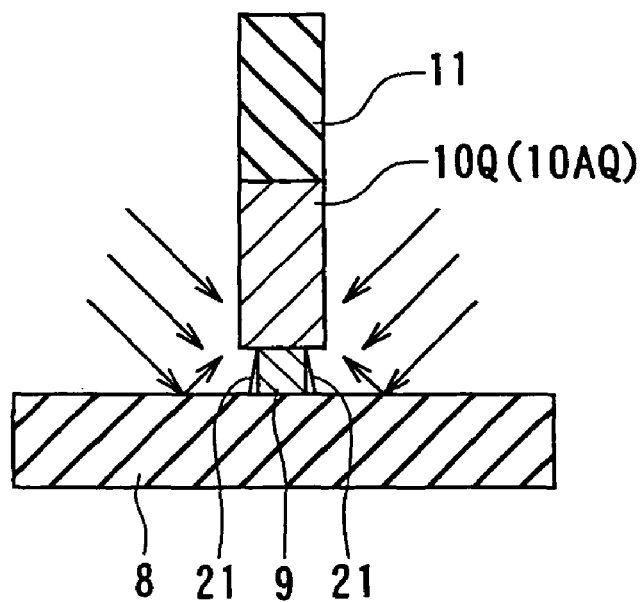
FIG. 14 is a cross-sectional view for illustrating the step shown in FIG. 7A and FIG. 7B.
Figure 15:
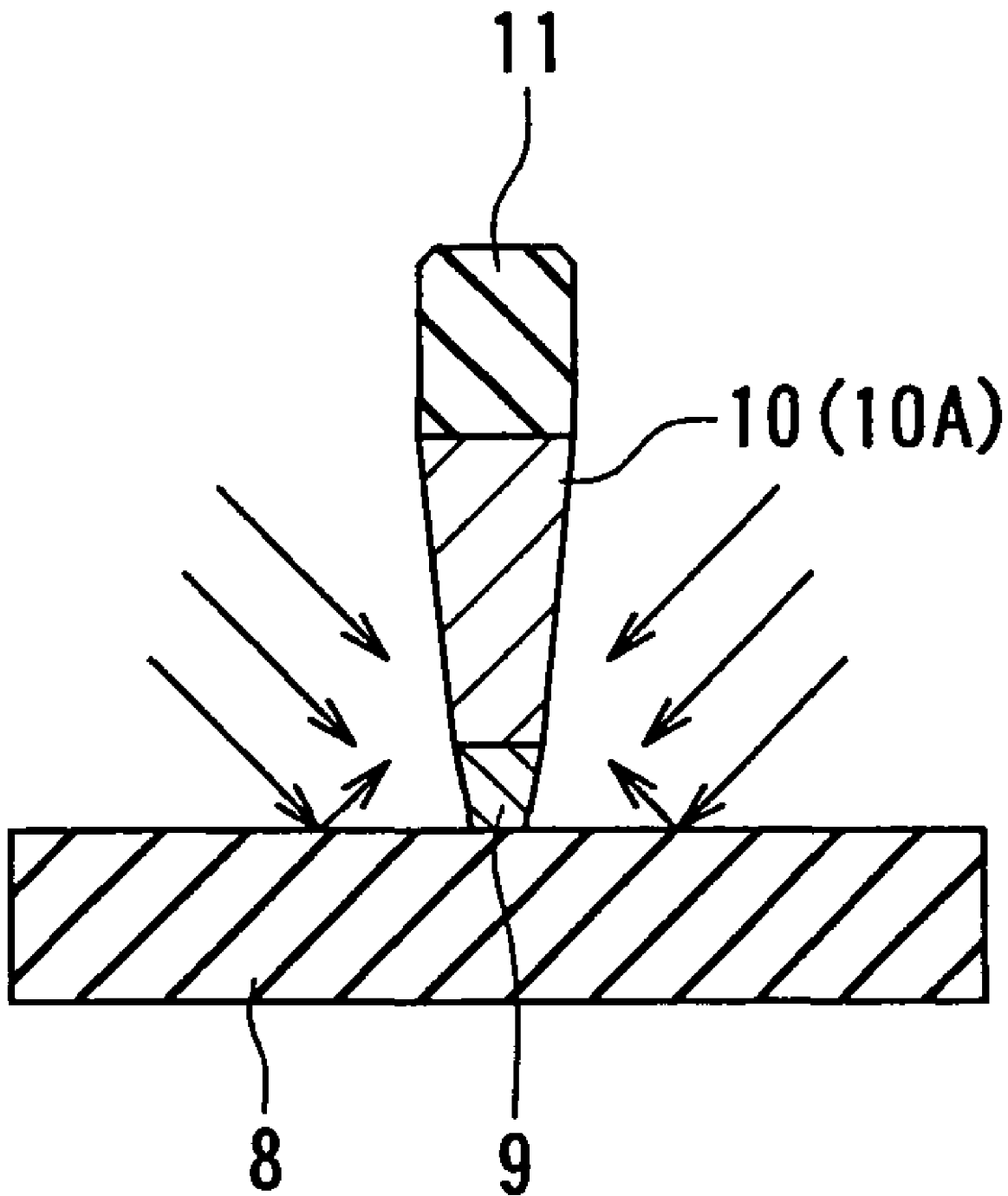
FIG. 15 is a cross-sectional view for illustrating the step shown in FIG. 8A and FIG. 8B.

Reference is now made to FIG. 13 to FIG. 15 to describe a detail of the step of etching both side surfaces of the portion 10AQ illustrated in FIG. 8A and FIG. 8B. FIG. 13 to FIG. 15 show cross sections of the underlying layer 9 and the portion 10AQ parallel to the medium facing surface 30. Arrows shown in FIG. 13 to FIG. 15 indicate the directions in which ions move.

FIG. 13 shows the step illustrated in FIG. 6A and FIG. 6B. In this step, first, the layer 10P to be patterned is selectively etched, using the alumina layer 11 as a mask. The layer 10P is thereby patterned and formed into the magnetic layer 10Q. Next, the underlying layer 9 is selectively etched, using the magnetic layer 10Q as a mask, to pattern the underlying layer 9. At this time, the width of the underlying layer 9 taken in the medium facing surface 30 is nearly equal to the width of the portion 10AQ taken in the medium facing surface 30. The layer 10P and the underlying layer 9 are etched by reactive ion etching or ion beam etching, for example. When the underlying layer 9 is etched, the substance 21 separated from the insulating layer 8 deposits on both sides of the underlying layer 9 patterned.

FIG. 14 shows the step illustrated in FIG. 7A and FIG. 7B. In this step, the underlying layer 9 is over-etched by reactive ion etching, for example. The underlying layer 9 patterned by this etching has a width taken in the medium facing surface 30 that is smaller than the width of the portion 10AQ taken in the medium facing surface 30. Through this etching, the substance 21 separated from the insulating layer 8 deposits on both sides of the underlying layer 9 patterned, too.

FIG. 15 shows the step illustrated in FIG. 8A and FIG. 8B. In this step, both side surfaces of the portion 10AQ are etched by ion beam etching to make the side surfaces of the portion 10AQ sloped, so that the width of the bottom surface of the portion 10AQ is smaller than the width of the top surface of the portion 10AQ.

In the embodiment, the underlying layer 9 is made of a material whose etching rate of ion beam etching is higher, compared with the magnetic alloy used to make the pole layer 10, i.e., the magnetic alloy used to make the magnetic layer 10Q. As a result, in the step illustrated in FIG. 15, etching of the underlying layer 9 proceeds faster, compared with the portion 10AQ. It is also noted that the material of the underlying layer 9 is the one whose etching rate of ion beam etching is higher, compared with the insulating material making the insulating layer 8 such as alumina. It is further noted that the material of the underlying layer 9 is the one that makes the amount of substance depositing on the other layers during ion beam etching smaller, compared with the insulating material making the insulating layer 8 such as alumina. Owing to these features, according to the embodiment, it is possible that the etching rate near the bottom of the portion 10AQ is higher, compared with the case in which the underlying layer 9 is not provided. It is thereby possible through ion beam etching performed for a short period of time to make the track width defining portion 10A have a desired shape, that is, such a shape that the end face of the track width defining portion 10A located in the medium facing surface 30 has a width that decreases as the distance from the first side A1 decreases.

In the embodiment it is alternatively possible that the step illustrated in FIG. 14 is omitted and both side surfaces of the portion 10AQ are etched as shown in FIG. 15, wherein this etching is started when the underlying layer 9 and the portion 10AQ have nearly equal widths that are taken in the medium facing surface 30, as shown in FIG. 13. In this case, too, etching of the underlying layer 9 proceeds faster, compared with the portion 10AQ, so that the track width defining portion 10A is made to have a desired shape.

If ion beam etching is performed for a long time to make the track width defining portion 10A have a desired shape, the neck height NH is made greater than a desired value and the overwrite property is thereby reduced. According to the embodiment, in contrast, the track width defining portion 10A is made to have a desired shape through ion beam etching performed for a short period as described above. It is therefore possible to prevent a case in which the neck height NH is made greater than a desired value and the overwrite property is thereby reduced.

According to the embodiment, the foregoing features allow the pole layer 10 having a shape capable of preventing problems resulting from the skew to be formed with accuracy.

In the embodiment it is alternatively possible that, in the step illustrated in FIG. 14, the underlying layer 9 is overetched so that a portion of the underlying layer 9 below the portion 10AQ is completely removed. In this case, since the underlying layer 9 exists in a region except the region below the portion 10AQ, the magnetic layer 10Q is supported by the underlying layer 9. In this case, the space created between the track width defining portion 10A and the insulating layer 8 will be filled with the nonmagnetic layer 12 later.

According to the embodiment, it is possible that the internal stress in the underlying layer 9 is tensile stress although this depends on the conditions for forming the underlying layer 9. When the internal stress in the underlying layer 9 is tensile stress, compressive stress is applied to the track width defining portion 10A in the direction orthogonal to the medium facing surface 30. Consequently, when the magnetostriction constant of the pole layer 10 is a positive value, magnetization in the direction parallel to the medium facing surface 30 is produced in the track width defining portion 10A by the inverse magnetostrictive effect. As a result, it is possible to suppress a phenomenon in which data stored on a recording medium is erased by a magnetic field generated by the track width defining portion 10A resulting from the residual magnetization of the pole layer 10 after writing is performed.

Figure 16:
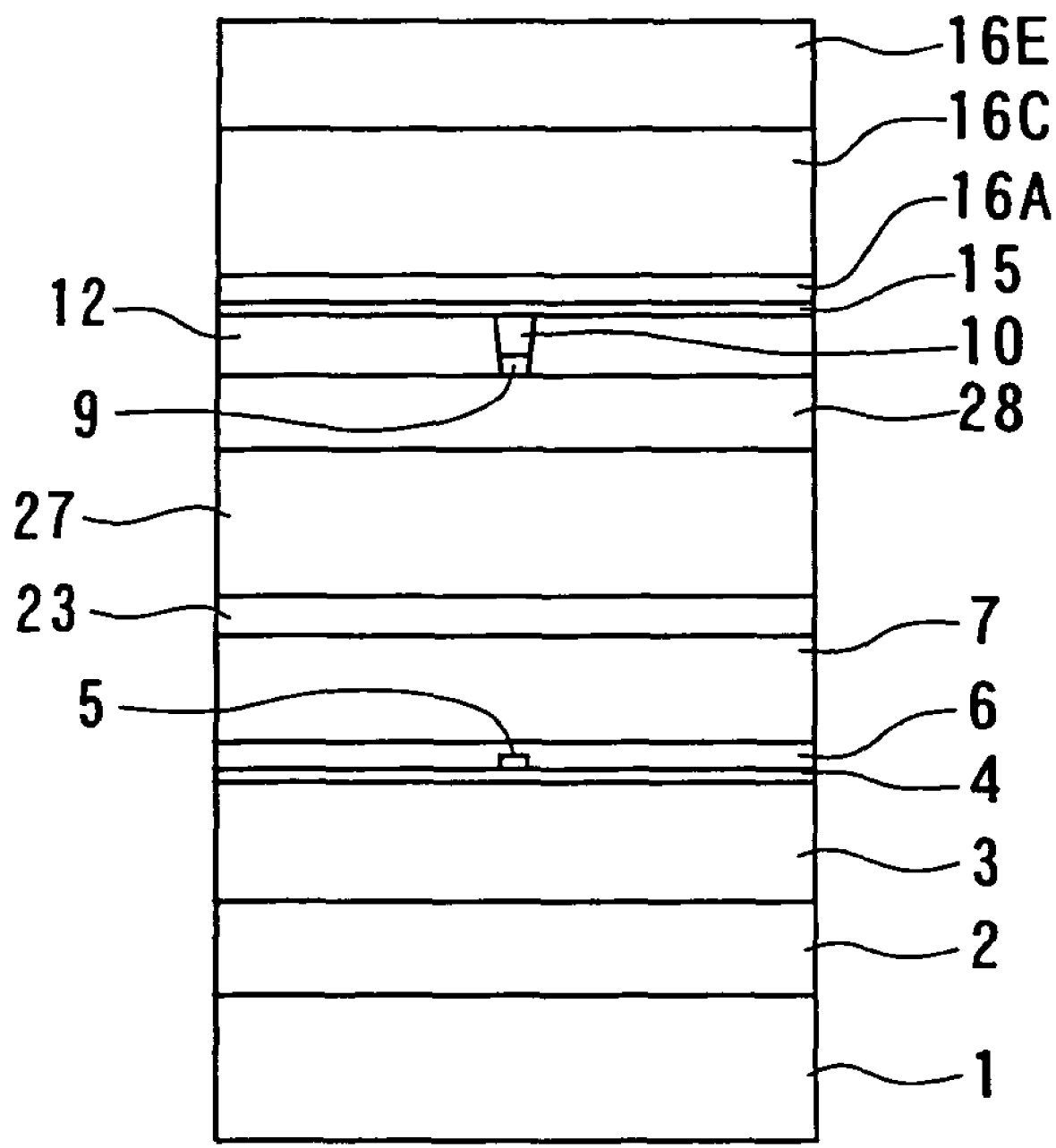
FIG. 16 is a front view of the medium facing surface of a modification example of the magnetic head of the first embodiment of the invention.
Figure 17:
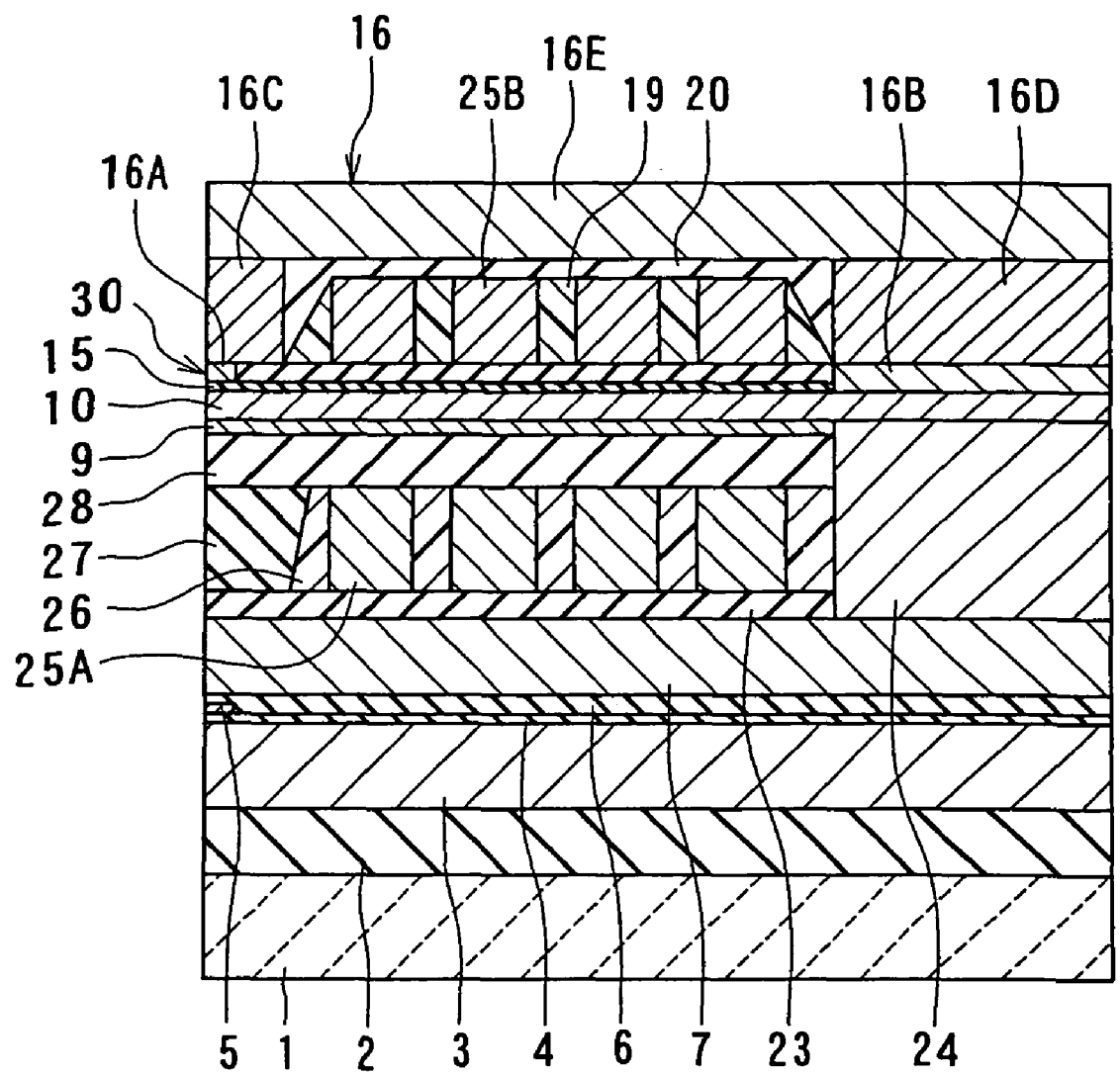
FIG. 17 is a cross-sectional view for illustrating the configuration of the modification example of the magnetic head of the first embodiment of the invention.

FIG. 16 and FIG. 17 illustrate a modification example of the magnetic head of the embodiment. FIG. 16 is a front view of a medium facing surface of the magnetic head of the modification example. FIG. 17 is a cross-sectional view for illustrating the configuration of the magnetic head of the modification example. FIG. 17 illustrates a cross section orthogonal to the medium facing surface and a surface of the substrate. As will be described in detail below, the magnetic head of the modification example comprises a coil wound around the pole layer 10 in a helical manner in place of the coil 18 shown in FIG. 1 and FIG. 2.

The magnetic head of the modification example comprises an insulating layer 23, a coupling layer 24, a plurality of first conductor portions 25A, and insulating layers 26, 27 and 28, in place of the insulating layer 8 shown in FIG. 1 and FIG. 2. The magnetic head of the modification example further comprises a plurality of second conductor portions 25B in place of the coil 18 shown in FIG. 1 and FIG. 2. The first and second conductor portions 25A and 25B are made of a conductive material such as copper. The insulating layer 23 is made of alumina, for example, and placed on the top shield layer 7. The insulating layer 23 has an opening located at a distance from the medium facing surface 30. The coupling layer 24 is made of a magnetic material and disposed on a portion of the top shield layer 7 where the opening of the insulating layer 23 is formed. The first conductor portions 25A are disposed on a portion of the insulating layer 23 between the coupling layer 24 and the medium facing surface 30. The insulating layer 26 is made of photoresist, for example, and disposed to cover the first conductor portions 25A. The insulating layer 27 is made of alumina, for example, and disposed to cover the first conductor portions 25A and the insulating layer 26. The insulating layer 28 is made of alumina, for example, and disposed on the first conductor portions 25A and the insulating layers 26 and 27. The underlying layer 9 is disposed on the top surface of the insulating layer 28.

The first conductor portions 25A are arranged between the top shield layer 7 and the pole layer 10 and extend in a direction intersecting the direction orthogonal to the medium facing surface 30. The second conductor portions 25B are arranged between the third layer 16E of the shield layer 16 and the pole layer 10 and extend in a direction intersecting the direction orthogonal to the medium facing surface 30. The first conductor portions 25A are connected to the second conductor portions 25B through a plurality of connecting portions not shown. These connecting portions are made of a conductive material such as copper. The coil is made up of the first and second conductor portions 25A and 25B and the connecting portions. The coil is wound around the pole layer 10 in a helical manner and insulated from the pole layer 10.

According to a method of manufacturing the magnetic head of the modification example, the portion from the insulating layer 23 to the underlying layer 9 are formed in the following manner. The insulating layer 23 is first formed on the top shield layer 7. Next, a portion of the insulating layer 23 located away from the medium facing surface 30 is selectively etched to form the opening of the insulating layer 23. Next, the first conductor portions 25A are formed on the insulating layer 23, and the coupling layer 24 is formed on the portion of the top shield layer 7 where the opening of the insulating layer 23 is formed. Next, the insulating layers 26, 27 and 28 are formed one by one. Next, the underlying layer 9 is formed on the insulating layer 28.

In the magnetic head of the modification example, a magnetic field corresponding to data to be recorded on the recording medium is generated by the coil made up of the first and second conductor portions 25A and 25B and the connecting portions. The top shield layer 7, the coupling layer 24, the pole layer 10 and the shield layer 16 form a magnetic path through which a magnetic flux corresponding to the field generated by the coil passes.

In the embodiment it is alternatively possible that, in addition to the flat-whorl-shaped coil 18 shown in FIG. 1 an FIG. 2, another flat-whorl-shaped coil is provided between the top shield layer 7 and the pole layer 10 and insulated from the top shield layer 7 and the pole layer 10.

Second Embodiment

Reference is now made to FIG. 18A to FIG. 25A and FIG. 18B to FIG. 25B to describe a magnetic head and a method of manufacturing the same of a second embodiment of the invention. FIG. 18A to FIG. 25A are cross sections of layered structures obtained through the manufacturing process of the magnetic head, the cross sections being orthogonal to the medium facing surface and the substrate. FIG. 18B to FIG. 25B are cross sections of portions of the layered structures near the medium facing surface that are parallel to the medium facing surface. Portions closer to the substrate 1 than the insulating layer 8 are omitted in FIG. 18A to FIG. 25A and FIG. 18B to FIG. 25B.

In the magnetic head of the second embodiment, the underlying layer 9 is made of a material having conductivity and whose etching rate of ion beam etching is higher, compared with the magnetic alloy making the pole layer 10. To be specific, the material of the underlying layer 9 contains any of Ta, Mo, W, Ti, Cr, Ni, Pd, Ru, TiW, TiN, NiCr, PtPd, and NiCu. The pole layer 10 is made up of a first layer 101 and a second layer 102 disposed on the first layer 101. The method of manufacturing the magnetic head of the second embodiment includes the steps up to the step of forming the underlying layer 9 that are the same as those of the first embodiment.

Figure 18A:
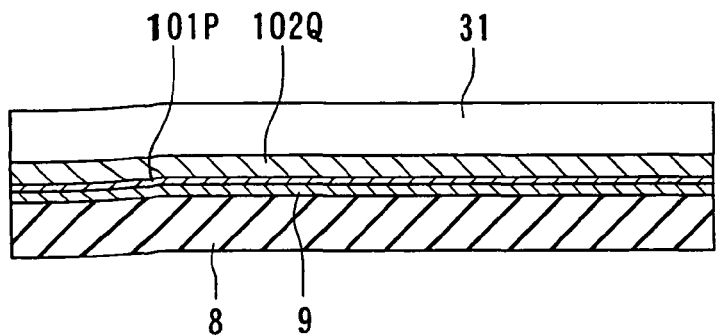
FIG. 18A and FIG. 18B are views for illustrating a step of a method of manufacturing a magnetic head of a second embodiment of the invention.
Figure 18B:
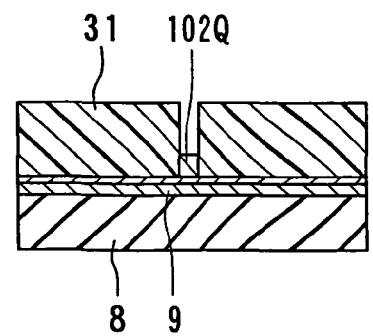

FIG. 18A and FIG. 18B illustrate the following step. In the step, first, an electrode film 101P having a thickness of 50 nm, for example, is formed by sputtering, for example, on the underlying layer 9. The electrode film 101P will be formed into the first layer 101 later. The electrode film 101P is made of a magnetic alloy including any of cobalt, iron and nickel. In the embodiment the electrode film 101P is made of CoFeN by way of example. Next, a photoresist layer having a thickness of 1 μm, for example, is formed on the electrode film 10P, and the photoresist layer is patterned to form a frame 31 for making a magnetic layer 102Q to be the second layer 102 later. As shown in FIG. 18B, the frame 31 has a groove having a shape corresponding to the magnetic layer 102Q. Next, a current is fed to the underlying layer 9 and the electrode film 101P to form the magnetic layer 102Q in the groove of the frame 31 by frame plating. At this time, the magnetic layer 102Q has a thickness that falls within a range of 0.5 to 0.8 μm inclusive, for example. The magnetic layer 102Q is made of a magnetic alloy including any of cobalt, iron and nickel. In the embodiment the magnetic layer 102Q is made of CoNiFe by way of example. The magnetic layer 102Q has a shape the same as that of the magnetic layer 10Q of the first embodiment.

Figure 19A:
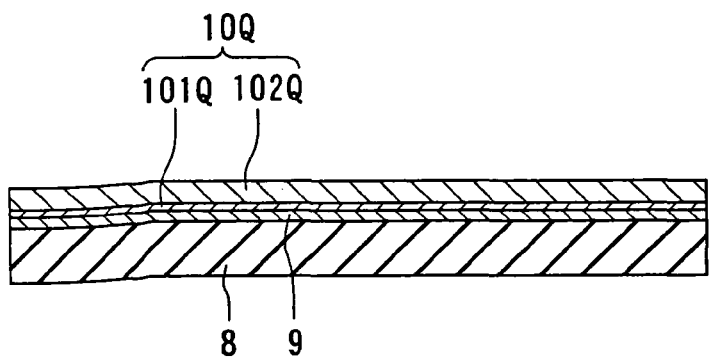
FIG. 19A and FIG. 19B are views for illustrating a step that follows the step shown in FIG. 18A and FIG. 18B.
Figure 19B:
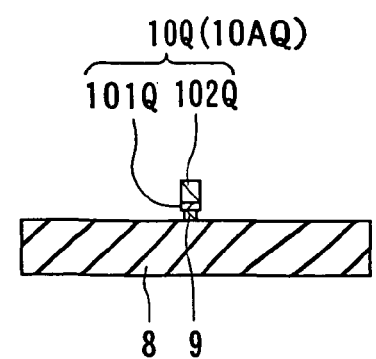

FIG. 19A and FIG. 19B illustrate the following step. In the step, first, the frame 31 is removed. Next, the electrode film 101P and the underlying layer 9 are selectively etched by reactive ion etching or ion beam etching, for example, using the magnetic layer 102Q as a mask. The electrode film 101P patterned by this etching is called an electrode film 11Q. The layered structure made up of the electrode film 101Q and the magnetic layer 102Q at this time is called the magnetic layer 10Q. The magnetic layer 10Q includes the portion 10AQ to be etched as in the first embodiment.

Next, the underlying layer 9 is over-etched by reactive ion etching, for example. As shown in FIG. 19B, the underlying layer 9 patterned by this etching has a width taken in the medium facing surface 30 that is smaller than the width of the portion 10AQ taken in the medium facing surface 30. The step of over-etching the underlying layer 9 may be omitted.

FIG. 20A and FIG. 20B illustrate the following step. In the step both side surfaces of the portion 10AQ are etched by ion beam etching to make the side surfaces of the portion 10AQ sloped, so that the width of the bottom surface of the portion 10AQ is smaller than the width of the top surface of the portion 10AQ. The conditions for etching the side surfaces of the portion 10AQ are the same as those of the first embodiment. Through this step, both side surfaces of the portion 10AQ are sloped by etching, so that the portion 10AQ becomes the track width defining portion 10A, the magnetic layer 10Q becomes the pole layer 10, the electrode film 101Q becomes the first layer 101, and the magnetic layer 102Q becomes the second layer 102.

FIG. 21A and FIG. 21B illustrate the following step. In the step, first, the nonmagnetic layer 12 having a thickness equal to the total thickness of the underlying layer 9 and the pole layer 10 is formed on the entire top surface of the layered structure. Next, the stopper film 13 having a thickness of 10 to 20 nm, for example, is formed on the nonmagnetic layer 12 except a region near the pole layer 10. The stopper film 13 is made of a material the same as that of the first embodiment. Next, the insulating film 14 made of alumina, for example, and having a thickness of 0.3 to 0.8 µm, for example, is formed on the entire top surface of the layered structure.

FIG. 22A and FIG. 22B illustrate the following step. In the step, first, the insulating film 14 and the nonmagnetic layer 12 are polished by CMP, for example. This polishing is stopped when the stopper film 13 is exposed. Next, the stopper film 13 is removed by reactive ion etching or wet etching, for example. The top surface of the nonmagnetic layer 12 is thereby exposed. Next, the top surfaces of the nonmagnetic layer 12 and the insulating film 14 are slightly polished by CMP, for example, to expose the top surface of the pole layer 10 and to flatten the top surfaces of the pole layer 10 and the nonmagnetic layer 12. The thickness of the pole layer 10 is thereby controlled to be of a desired value.

Next, the gap layer 15 is formed on the entire top surface of the layered structure. Next, a portion of the gap layer 15 away from the medium facing surface 30 is selectively etched to form an opening in the gap layer 15. Next, the first layer 16A is formed on the gap layer 15, and the coupling layer 16B is formed on a portion of the pole layer 10 where the opening of the gap layer 15 is formed. The first layer 16A and the coupling layer 16B may be formed by frame plating or by making a magnetic layer through sputtering and selectively etching the magnetic layer. Next, the nonmagnetic layer 17 is formed on the entire top surface of the layered structure. Next, the nonmagnetic layer 17 is polished by CMP, for example, so that the first layer 16A and the coupling layer 16B are exposed, and the top surfaces of the first layer 16A, the coupling layer 16B and the nonmagnetic layer 17 are flattened.

FIG. 23A and FIG. 23B illustrate the following step. In the step, first, the coil 18 is formed by frame plating, for example, such that at least part of the coil 18 is disposed on the nonmagnetic layer 17. Next, the second layer 16C and the coupling layer 16D are formed by frame plating, for example. Alternatively, the coil 18 may be formed after the second layer 16C and the coupling layer 16D are formed. Next, the insulating layer 19 made of photoresist, for example, is selectively formed to cover the coil 18. Next, an insulating layer 32 made of alumina, for example, and having a thickness of 2.5 µm, for example, is formed on the entire top surface of the layered structure.

FIG. 24A and FIG. 24B illustrate the following step. In the step, first, the insulating layer 32 and the insulating layer 19 are polished by CMP, for example, so that the second layer 16C, the coupling layer 16D and the coil 18 are exposed, and the top surfaces of the second layer 16C, the coupling layer 16D, the coil 18 and the insulating layer 19 are thereby flattened. Next, an insulating layer 33 made of alumina, for example, and having a thickness of 0.2 µm, for example, is formed on the coil 18 and the insulating layer 19.

Next, as shown in FIG. 25A and FIG. 25B, the third layer 16E is formed by frame plating, for example, to complete the shield layer 16. Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the second embodiment, as thus described, the magnetic layer 10Q to be the pole layer 10 is formed by plating. The remainder of configuration, operation and effects of the second embodiment are similar to those of the first embodiment.

Third Embodiment

Reference is now made to FIG. 26A to FIG. 34A and FIG. 26B to FIG. 34B to describe a magnetic head and a method of manufacturing the same of a third embodiment of the invention. FIG. 26A to FIG. 34A are cross sections of layered structures obtained through the manufacturing process of the magnetic head, the cross sections being orthogonal to the medium facing surface and the substrate. FIG. 26B to FIG. 34B are cross sections of portions of the layered structures near the medium facing surface that are parallel to the medium facing surface. Portions closer to the substrate 1 than the insulating layer 8 are omitted in FIG. 26A to FIG. 34A and FIG. 26B to FIG. 34B.

The method of manufacturing the magnetic head of the third embodiment includes the steps up to the step of forming the insulating layer 8 that are the same as those of the first embodiment.

FIG. 26A and FIG. 26B illustrate the following step. In the step, first, a yoke layer 37 made of a magnetic material and having a thickness of 1 µm, for example, is formed by frame plating, for example, on the insulating layer 8. The yoke layer 37 may be made of CoNiFe, for example. An end of the yoke layer 37 closer to the medium facing surface 30 is located at a distance from the medium facing surface 30. Next, an insulating layer 38 made of alumina, for example, and having a thickness of 2 µm, for example, is formed by sputtering, for example, on the entire top surface of the layered structure.

FIG. 27A and FIG. 27B illustrate the following step. In the step, first, the insulating layer 38 is polished by CMP, for example, so that the yoke layer 37 is exposed. Through this polishing, a difference in level of 0.1 µm, for example, is created between the top surface of the yoke layer 37 and the top surface of the insulating layer 38, so that the top surface of the insulating layer 38 is made closer to the substrate 1. This may be achieved by using such a slurry for polishing that the insulating layer 38 is chemically polished faster than the yoke layer 37, such as a weak-alkaline slurry. Next, the underlying layer 9 having a thickness of 0.3 µm, for example, is formed by sputtering, for example, on the entire top surface of the layered structure. The underlying layer 9 is made of a material the same as that of the first embodiment.

Figure 28A:
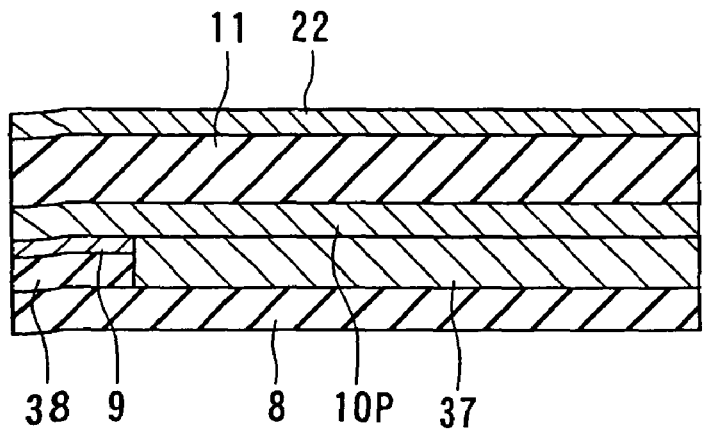
FIG. 28A and FIG. 28B are views for illustrating a step that follows the step shown in FIG. 27A and FIG. 27B.
Figure 28B:
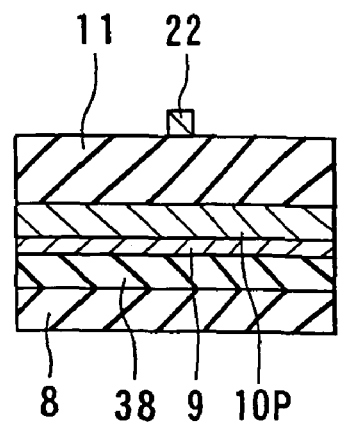

FIG. 28A and FIG. 28B illustrate the following step. In the step, first, the underlying layer 9 is polished by CMP, for example, so that the yoke layer 37 is exposed. As a result, the underlying layer 9 having a thickness of 0.1 µm, for example, is disposed on the insulating layer 8 in a region from the medium facing surface 30 to the end of the yoke layer 37 closer to the medium facing surface 30. Next, the layer 10P to be patterned that will be finally the pole layer 10 is formed on the underlying layer 9 and the yoke layer 37 by sputtering, for example. The material and the thickness of the layer 10P are the same as those of the first embodiment.

Next, the alumina layer 11 having a thickness of 1.2 µm, for example, is formed by sputtering, for example, on the layer 10P. Next, the etching mask 22 made of CoFe or CoNiFe, for example, and having a thickness of 0.3 to 0.6 µm, for example, is formed by frame plating on the alumina layer 11. The mask 22 has a plane geometry corresponding to that of the pole layer 10 to be formed.

Figure 29A:
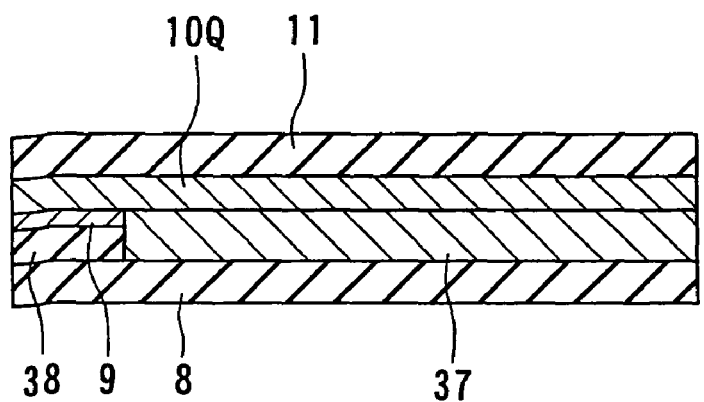
FIG. 29A and FIG. 29B are views for illustrating a step that follows the step shown in FIG. 28A and FIG. 28B.
Figure 29B:
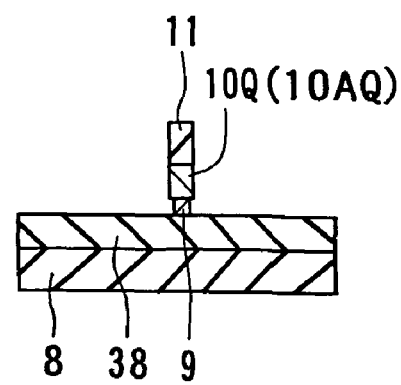

FIG. 29A and FIG. 29B illustrate the following step. In the step, first, the alumina layer 11 is selectively etched, using the mask 22. Etching of the alumina layer 11 is performed by reactive ion etching, for example. Next, the layer 10P is selectively etched, using the portion of the alumina layer 11 remaining after the etching as a mask. Through this etching, the layer 10P is patterned to be the magnetic layer 10Q that will be the pole layer 10 later. The magnetic layer 10Q includes the portion 10AQ to be etched that will be formed into the track width defining portion 10A by etching both side surfaces of the portion 10AQ to form sloped surfaces. The method of etching the layer 10P is the same as that of the first embodiment.

Next, the underlying layer 9 is selectively etched, using the magnetic layer 10Q as a mask, and patterned. Etching of the underlying layer 9 is also performed in a manner the same as that of the first embodiment. Next, the underlying layer 9 is over-etched by reactive ion etching, for example. As shown in FIG. 29B, the underlying layer 9 patterned by this etching has a width taken in the medium facing surface 30 that is smaller than the width of the portion 10AQ taken in the medium facing surface 30. The conditions for etching the underlying layer 9 by reactive ion etching may be the same as the conditions for etching the layer 10P. The step of over-etching the underlying layer 9 may be omitted.

FIG. 30A and FIG. 30B illustrate the following step. In the step both side surfaces of the portion 10AQ are etched by ion beam etching to make the side surfaces of the portion 10AQ sloped, so that the width of the bottom surface of the portion 10AQ is smaller than the width of the top surface of the portion 10AQ. The conditions for etching the side surfaces of the portion 10AQ are the same those of the first embodiment. Through this step, both side surfaces of the portion 10AQ are sloped by etching, so that the portion 10AQ becomes the track width defining portion 10A and the magnetic layer 10Q becomes the pole layer 10.

FIG. 31A and FIG. 31B illustrate the following step. In the step, first, the nonmagnetic layer 12 having a thickness equal to the total thickness of the underlying layer 9 and the pole layer 10 is formed on the entire top surface of the layered structure. Next, the stopper film 13 having a thickness of 10 to 20 nm, for example, is formed on the nonmagnetic layer 12 except a region near the pole layer 10. The stopper film 13 is made of a material the same as that of the first embodiment, such as a nonmagnetic refractory metal including Ta, Ru or W.

Next, the insulating film 14 made of alumina, for example, and having a thickness of 0.3 to 0.8 µm, for example, is formed on the entire top surface of the layered structure.

FIG. 32A and FIG. 32B illustrate the following step. In the step, first, the insulating film 14 and the nonmagnetic layer 12 are polished by CMP, for example. This polishing is stopped when the stopper film 13 is exposed. Next, the stopper film 13 is removed by reactive ion etching or wet etching, for example. The top surface of the nonmagnetic layer 12 is thereby exposed. Next, the top surfaces of the nonmagnetic layer 12 and the insulating film 14 are slightly polished by CMP, for example, to expose the top surface of the pole layer 10 and to flatten the top surfaces of the pole layer 10 and the nonmagnetic layer 12. The thickness of the pole layer 10 is thereby controlled to be of a desired value.

FIG. 33A and FIG. 33B illustrate the following step. In the step, first, the gap layer 15 is formed on the entire top surface of the layered structure. Next, a portion of the gap layer 15 away from the medium facing surface 30 is selectively etched to form an opening in the gap layer 15. Next, the first layer 16A is formed on the gap layer 15, and the coupling layer 16B is formed on a portion of the pole layer 10 where the opening of the gap layer 15 is formed. The first layer 16A and the coupling layer 16B may be formed by frame plating or by making a magnetic layer through sputtering and selectively etching the magnetic layer. Next, the nonmagnetic layer 17 is formed on the entire top surface of the layered structure. Next, the nonmagnetic layer 17 is polished by CMP, for example, so that the first layer 16A and the coupling layer 16B are exposed, and the top surfaces of the first layer 16A, the coupling layer 16B and the nonmagnetic layer 17 are flattened.

Figure 34A:
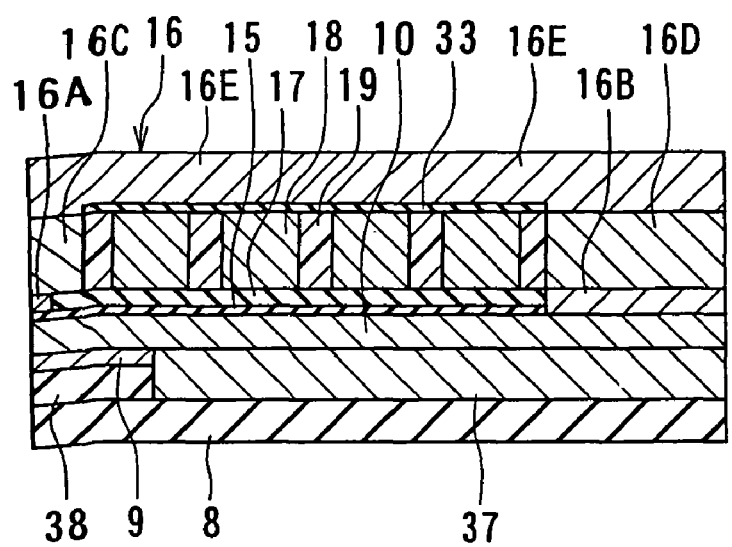
FIG. 34A and FIG. 34B are views for illustrating a step that follows the step shown in FIG. 33A and FIG. 33B.
Figure 34B:
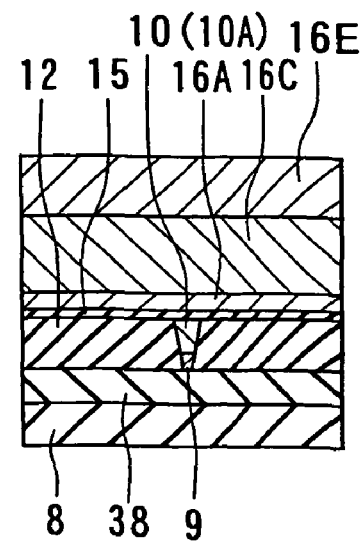

FIG. 34A and FIG. 34B illustrate the following step. In the step, first, the coil 18 is formed by frame plating, for example, such that at least part of the coil 18 is disposed on the nonmagnetic layer 17. Next, the second layer 16C and the coupling layer 16D are formed by frame plating, for example. Alternatively, the coil 18 may be formed after the second layer 16C and the coupling layer 16D are formed. Next, the insulating layer 19 made of photoresist, for example, is selectively formed to cover the coil 18. Next, an insulating film not shown made of alumina, for example, and having a thickness of 2.5 µm, for example, is formed on the entire top surface of the layered structure. Next, the insulating film not shown and the insulating layer 19 are polished by CMP, for example, so that the second layer 16C, the coupling layer 16D and the coil 18 are exposed, and the top surfaces of the second layer 16C, the coupling layer 16D, the coil 18 and the insulating layer 19 are thereby flattened. Next, the insulating layer 33 made of alumina, for example, and having a thickness of 0.2 µm, for example, is formed on the coil 18 and the insulating layer 19.

Next, the third layer 16E is formed by frame plating, for example, to complete the shield layer 16. Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the third embodiment, as thus described, the underlying layer 9 is not provided in the entire region below the pole layer 10 but at least in the region below the track width defining portion 10A of the pole layer 10. According to the embodiment, the yoke layer 37 connected to the pole layer 10 is provided. The yoke layer 37 together with the pole layer 10 and the shield layer 16 form a magnetic path through which a magnetic flux corresponding to the field generated by the coil 18 passes. The remainder of configuration, operation and effects of the third embodiment are similar to those of the first embodiment.

Fourth Embodiment

Reference is now made to FIG. 35A to FIG. 43A and FIG. 35B to FIG. 43B to describe a magnetic head and a method of manufacturing the same of a fourth embodiment of the invention. FIG. 35A to FIG. 43A are cross sections of layered structures obtained through the manufacturing process of the magnetic head, the cross sections being orthogonal to the medium facing surface and the substrate. FIG. 35B to FIG. 43B are cross sections of portions of the layered structures near the medium facing surface that are parallel to the medium facing surface. Portions closer to the substrate 1 than the insulating layer 8 are omitted in FIG. 35A to FIG. 43A and FIG. 35B to FIG. 43B.

The method of manufacturing the magnetic head of the fourth embodiment includes the steps up to the step of forming the insulating layer 8 that are the same as those of the first embodiment.

Figure 35A:
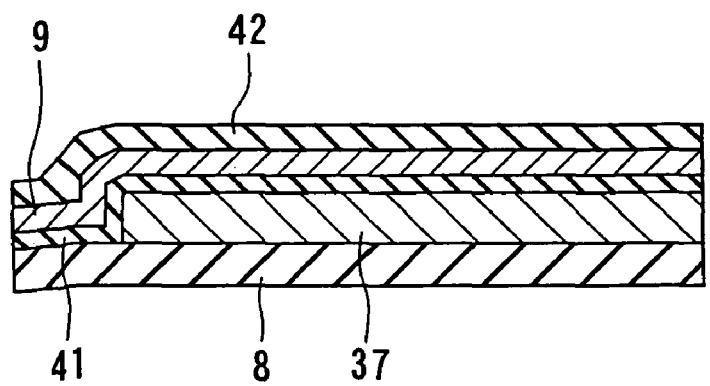
FIG. 35A and FIG. 35B are views for illustrating a step of a method of manufacturing a magnetic head of a fourth embodiment of the invention.
Figure 35B:
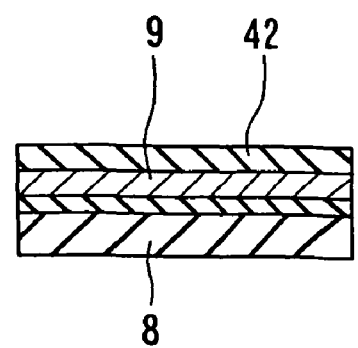
Figure 55:
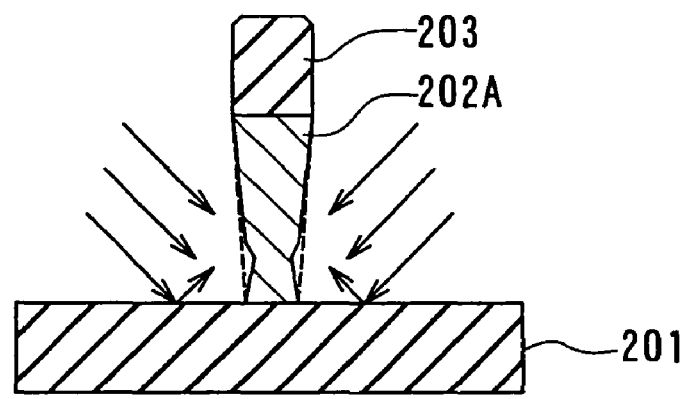
FIG. 55 is a cross-sectional view for illustrating the example of the method of forming the pole layer.
Figure 56:
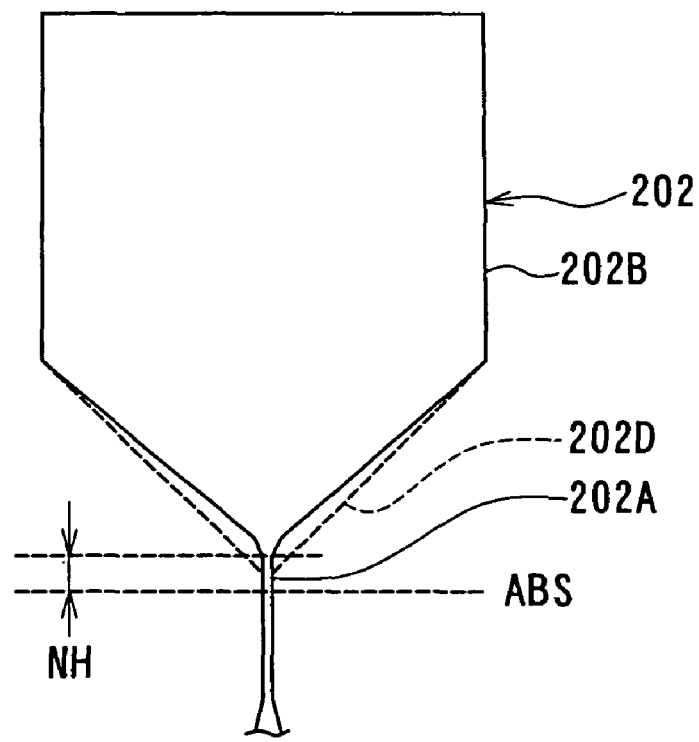
FIG. 56 is a top view of the pole layer of FIG. 55.

FIG. 35A and FIG. 35B illustrate the following step. In the step, first, the yoke layer 37 made of a magnetic material and having a thickness of 1 µm, for example, is formed by frame plating, for example, on the insulating layer 8. The yoke layer 37 may be made of CoNiFe, for example. An end of the yoke layer 37 closer to the medium facing surface 30 is located at a distance from the medium facing surface 30. Next, an insulating layer 41, the underlying layer 9 and an insulating layer 42 are formed by sputtering, for example, on the entire top surface of the layered structure one by one. The insulating layers 41 and 42 are made of alumina, for example. The underlying layer 9 is made of a material the same as that of the first embodiment. The insulating layer 41, the underlying layer 9 and the insulating layer 42 have thicknesses of 0.2 µm, 0.1 µm and 0.5 µm, respectively, for example.

Next, as shown in FIG. 36A and FIG. 36B, the insulating layer 42, the underlying layer 9 and the insulating layer 41 are polished by CMP, for example, so that the yoke layer 37 and the underlying layer 9 are exposed. As a result, the underlying layer 9 having a thickness of 0.1 µm, for example, is disposed on the insulating layer 41 in a region from the medium facing surface 30 to the end of the yoke layer 37 closer to the medium facing surface 30. The insulating layer 41 is also disposed between the end of the yoke layer 37 closer to the medium facing surface 30 and an end of the underlying layer 9 closer to the yoke layer 37.

FIG. 37A and FIG. 37B illustrate the following step. In the step, first, the layer 10P to be patterned that will be finally the pole layer 10 is formed on the underlying layer 9, the yoke layer 37 and the insulating layer 41 by sputtering, for example. The material and the thickness of the layer 10P are the same as those of the first embodiment.

Next, the alumina layer 11 having a thickness of 1.2 µm, for example, is formed by sputtering, for example, on the layer 10P. Next, the etching mask 22 made of CoFe or CoNiFe, for example, and having a thickness of 0.3 to 0.6 µm, for example, is formed by frame plating on the alumina layer 11. The mask 22 has a plane geometry corresponding to that of the pole layer 10 to be formed.

FIG. 38A and FIG. 38B illustrate the following step. In the step, first, the alumina layer 11 is selectively etched, using the mask 22. Etching of the alumina layer 11 is performed by reactive ion etching, for example. Next, the layer 10P is selectively etched, using the portion of the alumina layer 11 remaining after the etching as a mask. Through this etching, the layer 10P is patterned to be the magnetic layer 10Q that will be the pole layer 10 later. The magnetic layer 10Q includes the portion 10AQ to be etched that will be formed into the track width defining portion 10A by etching both side surfaces of the portion 10AQ to form sloped surfaces. The method of etching the layer 10P is the same as that of the first embodiment.

Next, the underlying layer 9 is selectively etched, using the magnetic layer 10Q as a mask, and patterned. Etching of the underlying layer 9 is also performed in a manner the same as that of the first embodiment. Next, the underlying layer 9 is over-etched by reactive ion etching, for example. As shown in FIG. 38B, the underlying layer 9 patterned by this etching has a width taken in the medium facing surface 30 that is smaller than the width of the portion 10AQ taken in the medium facing surface 30. The conditions for etching the underlying layer 9 by reactive ion etching may be the same as the conditions for etching the layer 10P. The step of over-etching the underlying layer 9 may be omitted.

FIG. 39A and FIG. 39B illustrate the following step. In the step both side surfaces of the portion 10AQ are etched by ion beam etching to make the side surfaces of the portion 10AQ sloped, so that the width of the bottom surface of the portion 10AQ is smaller than the width of the top surface of the portion 10AQ. The conditions for etching the side surfaces of the portion 10AQ are the same those of the first embodiment. Through this step, both side surfaces of the portion 10AQ are sloped by etching, so that the portion 10AQ becomes the track width defining portion 10A and the magnetic layer 10Q becomes the pole layer 10.

FIG. 40A and FIG. 40B illustrate the following step. In the step, first, the nonmagnetic layer 12 having a thickness equal to the total thickness of the underlying layer 9 and the pole layer 10 is formed on the entire top surface of the layered structure. Next, the stopper film 13 having a thickness of 10 to 20 nm, for example, is formed on the nonmagnetic layer 12 except a region near the pole layer 10. The stopper film 13 is made of a material the same as that of the first embodiment. Next, the insulating film 14 made of alumina, for example, and having a thickness of 0.3 to 0.8 µm, for example, is formed on the entire top surface of the layered structure.

FIG. 41A and FIG. 41B illustrate the following step. In the step, first, the insulating film 14 and the nonmagnetic layer 12 are polished by CMP, for example. This polishing is stopped when the stopper film 13 is exposed. Next, the stopper film 13 is removed by reactive ion etching or wet etching, for example. The top surface of the nonmagnetic layer 12 is thereby exposed. Next, the top surfaces of the nonmagnetic layer 12 and the insulating film 14 are slightly polished by CMP, for example, to expose the top surface of the pole layer 10 and to flatten the top surfaces of the pole layer 10 and the nonmagnetic layer 12. The thickness of the pole layer 10 is thereby controlled to be of a desired value.

FIG. 42A and FIG. 42B illustrate the following step. In the step, first, the gap layer 15 is formed on the entire top surface of the layered structure. Next, a portion of the gap layer 15 away from the medium facing surface 30 is selectively etched to form an opening in the gap layer 15. Next, the first layer 16A is formed on the gap layer 15, and the coupling layer 16B is formed on a portion of the pole layer 10 where the opening of the gap layer 15 is formed. The first layer 16A and the coupling layer 16B may be formed by frame plating or by making a magnetic layer through sputtering and selectively etching the magnetic layer. Next, the nonmagnetic layer 17 is formed on the entire top surface of the layered structure. Next, the nonmagnetic layer 17 is polished by CMP, for example, so that the first layer 16A and the coupling layer 16B are exposed, and the top surfaces of the first layer 16A, the coupling layer 16B and the nonmagnetic layer 17 are flattened.

FIG. 43A and FIG. 43B illustrate the following step. In the step, first, the coil 18 is formed by frame plating, for example, such that at least part of the coil 18 is disposed on the nonmagnetic layer 17. Next, the second layer 16C and the coupling layer 16D are formed by frame plating, for example. Alternatively, the coil 18 may be formed after the second layer 16C and the coupling layer 16D are formed. Next, the insulating layer 19 made of photoresist, for example, is selectively formed to cover the coil 18. Next, an insulating film not shown made of alumina, for example, and having a thickness of 2.5 µm, for example, is formed on the entire top surface of the layered structure. Next, the insulating film not shown and the insulating layer 19 are polished by CMP, for example, so that the second layer 16C, the coupling layer 16D and the coil 18 are exposed, and the top surfaces of the second layer 16C, the coupling layer 16D, the coil 18 and the insulating layer 19 are thereby flattened. Next, the insulating layer 33 made of alumina, for example, and having a thickness of 0.2 µm, for example, is formed on the coil 18 and the insulating layer 19.

Next, the third layer 16E is formed by frame plating, for example, to complete the shield layer 16. Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the fourth embodiment, as thus described, the underlying layer 9 is not provided in the entire region below the pole layer 10 but at least in the region below the track width defining portion 10A of the pole layer 10. According to the embodiment, the yoke layer 37 connected to the pole layer 10 is provided. The yoke layer 37 together with the pole layer 10 and the shield layer 16 form a magnetic path through which a magnetic flux corresponding to the field generated by the coil 18 passes. The remainder of configuration, operation and effects of the fourth embodiment are similar to those of the first embodiment.

Fifth Embodiment

Reference is now made to FIG. 44A to FIG. 53A and FIG. 44B to FIG. 53B to describe a magnetic head and a method of manufacturing the same of a fifth embodiment of the invention. FIG. 44A to FIG. 53A are cross sections of layered structures obtained through the manufacturing process of the magnetic head, the cross sections being orthogonal to the medium facing surface and the substrate. FIG. 44B to FIG. 53B are cross sections of portions of the layered structures near the medium facing surface that are parallel to the medium facing surface. Portions closer to the substrate 1 than the insulating layer 8 are omitted in FIG. 44A to FIG. 53A and FIG. 44B to FIG. 53B.

In the magnetic head of the fifth embodiment the pole layer 10 is made up of a first layer 51 and a second layer 52 disposed on the first layer 51. The magnetic head of the fifth embodiment comprises a gap layer 55, a shield layer 56, a nonmagnetic layer 57, an insulating layer 58, a coil 59, and insulating layers 60 and 61, in place of the gap layer 15, the shield layer 16, the nonmagnetic layer 17, the coil 18, and the insulating layers 19 and 20 of the first embodiment. The gap layer 55 is made of a material the same as that of the gap layer 15. The shield layer 56 incorporates a first layer 56A, a yoke layer 56B, a second layer 56C, a coupling layer 56D and a third layer 56E. These layers are made of NiFe or CoNiFe, for example.

The method of manufacturing the magnetic head of the fifth embodiment includes the steps up to the step of forming the underlying layer 9 that are the same as those of the first embodiment. The underlying layer 9 of the fifth embodiment is made of a material having conductivity and whose etching rate of ion beam etching is higher, compared with the magnetic alloy making the pole layer 10. To be specific, the material of the underlying layer 9 contains any of Ta, Mo, W, Ti, Cr, Ni, Pd, Ru, TiW, TiN, NiCr, PtPd, and NiCu. The underlying layer 9 of the fifth embodiment has a thickness that falls within a range of 50 to 100 nm inclusive, for example.

FIG. 44A and FIG. 44B illustrate the following step. In the step, first, an electrode film 51P is formed by sputtering, for example, on the underlying layer 9. The electrode film 51P has a thickness that falls within a range of 10 to 20 nm inclusive, for example. The electrode film 51P will be formed into the first layer 51 later. The electrode film 51P is made of a magnetic alloy including any of cobalt, iron and nickel. In the embodiment the electrode film 51P is made of CoFeN or NiFe by way of example.

FIG. 45A and FIG. 45B illustrate the following step. In the step, first, a photoresist layer having a thickness of 1 µm, for example, is formed on the electrode film 51P, and the photoresist layer is patterned to form a frame 53 for making the second layer 52. As shown in FIG. 45B, the frame 53 has a groove having a shape corresponding to the second layer 52. The groove has two walls corresponding to both side surfaces of the track width defining portion 10A of the pole layer 10. The space between these two walls increases as the distance from the upper portion of the groove decreases. Each of the two walls forms an angle that falls within a range of 5 to 12 degrees inclusive, for example, with respect to the top surface of the substrate 1.

Next, the second layer 52 is formed in the groove of the frame 53 by frame plating. At this time, the second layer 52 has a thickness of 0.7 µm, for example. The second layer 52 is made of a magnetic alloy including any of cobalt, iron and nickel. In the embodiment the second layer 52 is made of CoNiFe or NiFe by way of example.

When the second layer 52 is formed, a current is fed to the underlying layer 9 and the electrode film 51P. In the fifth embodiment the underlying layer 9 and the electrode film 51P function as electrodes for plating.

Next, as shown in FIG. 46A and FIG. 46B, the frame 53 is removed. FIG. 47A and FIG. 47B illustrate the following step. In the step, first, the electrode film 51P except a portion below the second layer 52 is removed by ion beam etching. As a result, the electrode film 51P becomes the first layer 51, and the pole layer 10 made up of the first layer 51 and the second layer 52 is formed. Next, the underlying layer 9 except a portion below the pole layer 10 is removed by ion beam etching. Etching of the electrode film 51P and the underlying layer 9 may be performed such that the direction in which ion beams move forms an angle of 45 to 55 degrees with respect to the direction orthogonal to the top surface of the substrate 1. In the step illustrated in FIG. 47A and FIG. 47B, both side surfaces of the track width defining portion 10A may also be etched by ion beam etching. The amount of etching of the track width defining portion 10A may be controlled by adjusting the period for which etching is performed, for example. It is thereby possible to adjust such that the track width has a desired value and that a desired angle is obtained between each of both side surfaces of the track width defining portion 10A and the direction orthogonal to the top surface of the substrate 1.

FIG. 48A and FIG. 48B illustrate the following step. In the step, first, the nonmagnetic layer 12 having a thickness that falls within a range of 0.8 to 1.2 µm inclusive, for example, is formed on the entire top surface of the layered structure. Next, the nonmagnetic layer 12 and the pole layer 10 are polished by CMP, for example, so that the pole layer 10 has a thickness that falls within a range of 0.2 to 0.35 µm inclusive, for example. The point at which this polishing is stopped may be controlled through the use of a stopper film as in the first embodiment.

FIG. 49A and FIG. 49B illustrate the following step. In the step, first, the gap layer 55 is formed by sputtering, for example, on the entire top surface of the layered structure. Next, a portion of the gap layer 55 away from the medium facing surface 30 is selectively etched to form an opening in the gap layer 55. Next, the first layer 56A is formed on the gap layer 55, and the yoke layer 56B is formed on a portion of the pole layer 10 where the opening of the gap layer 55 is formed. The first layer 56A and the yoke layer 56B may be formed by frame plating or by making a magnetic layer through sputtering and selectively etching the magnetic layer.

Next, as shown in FIG. 50A and FIG. 50B, the nonmagnetic layer 57 having a thickness that falls within a range of 0.5 to 1.0 µm inclusive, for example, is formed on the entire top surface of the layered structure. The nonmagnetic layer 57 may be made of an inorganic insulating material such as alumina or coating glass.

FIG. 51A and FIG. 51B illustrate the following step. In the step, first, the nonmagnetic layer 57 is polished by CMP, for example, so that the first layer 56A and the yoke layer 56B are exposed, and the top surfaces of the first layer 56A, the yoke layer 56B and the nonmagnetic layer 57 are flattened. Through this polishing, the first layer 56A is made to have a thickness that falls within a range of 0.3 to 0.7 µm inclusive, for example. Next, the insulating layer 58 made of alumina, for example, and having a thickness that falls within a range of 0.2 to 0.3 µm inclusive, for example, is formed by sputtering, for example, on the entire top surface of the layered structure. Next, the insulating layer 58 except a portion where the coil 59 and the insulating layer 60 will be disposed later is removed by etching.

FIG. 52A and FIG. 52B illustrate the following step. In the step, first, the coil 59 is formed by frame plating, for example, so as to be disposed on the insulating layer 58. Next, the second layer 56C and the coupling layer 56D are formed by frame plating, for example. Alternatively, the coil 59 may be formed after the second layer 56C and the coupling layer 56D are formed.

FIG. 53A and FIG. 53B illustrate the following step. In the step, first, the insulating layer 60 made of photoresist, for example, is selectively formed to cover the coil 59. Next, an insulating film not shown made of alumina, for example, and having a thickness of 3 to 3.5 µm, for example, is formed on the entire top surface of the layered structure. Next, the insulating film not shown and the insulating layer 60 are polished by CMP, for example, so that the second layer 56C, the coupling layer 56D and the coil 59 are exposed, and the top surfaces of the second layer 56C, the coupling layer 56D, the coil 59 and the insulating layer 60 are thereby flattened. Next, the insulating layer 61 made of alumina, for example, and having a thickness of 0.2 µm, for example, is formed on the coil 59 and the insulating layer 60.

Next, the third layer 56E having a thickness of 1 to 3 µm, for example, is formed by frame plating, for example, to complete the shield layer 56. Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the fifth embodiment, the second layer 52 of the pole layer 10 is formed by plating. Then, the electrode film 51P to be the first layer 51 of the pole layer 10 except the portion located below the second layer 52 is removed by ion beam etching. According to the embodiment, the underlying layer 9 except the portion located below the pole layer 10 is further removed by ion beam etching.

The underlying layer 9 functions as part of the electrode used for making the second layer 52 by plating. Therefore, according to the embodiment, it is possible to make the thickness of the electrode film 51P smaller by the thickness of the underlying layer 9, compared with the case in which the underlying layer 9 is not provided. Furthermore, the underlying layer 9 is made of a material whose etching rate of ion beam etching is higher than that of the magnetic alloy making up the pole layer 10. It is therefore possible to finish etching of the underlying layer 9 in a short period of time. As a result, it is possible to make the period required for etching the electrode film 51P and the underlying layer 9 shorter than the period required when the underlying layer 9 is not provided. According to the embodiment, it is thereby possible to prevent a case in which the neck height is made greater than a desired value through etching performed for a long period.

It is also noted that the material of the underlying layer 9 is the one whose etching rate of ion beam etching is higher, compared with the insulating material making up the insulating layer 8 such as alumina. It is further noted that the material of the underlying layer 9 is the one that makes the amount of substance depositing on the other layers during ion beam etching smaller, compared with the insulating material making up the insulating layer 8 such as alumina. Owing to these features, according to the embodiment, it is possible to prevent a portion near the bottom of the track width defining portion 10A, in particular, from being out of shape, and to form the pole layer 10 having a desired shape with higher accuracy, compared with the case in which the underlying layer 9 is not provided.

According to the embodiment, the foregoing features allow the pole layer 10 having a shape capable of preventing problems resulting from the skew to be formed with accuracy. The remainder of configuration, operation and effects of the fifth embodiment are similar to those of the first embodiment.

The present invention is not limited to the foregoing embodiments but may be practiced in still other ways. For example, in any of the second to fifth embodiments, a coil wound around the pole layer 10 in a helical manner may be provided in place of the flat-whorl-shaped coil 18, as in the modification example of the first embodiment. Another alternative is that, in any of the second to fifth embodiments, another flat-whorl-shaped coil may be provided, in addition to the flat-whorl-shaped coil 18.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer including a track width defining portion having an end face located in the medium facing surface, the pole layer allowing a magnetic flux corresponding to the magnetic field generated by the coil to pass therethrough, and generating a write magnetic field for writing the data on the recording medium through the use of a perpendicular magnetic recording system; and
a substrate on which the pole layer and the coil are stacked, wherein:
the end face of the track width defining portion located in the medium facing surface has a first side close to the substrate, a second side located opposite to the first side, a third side connecting an end of the first side to an end of the second side, and a fourth side connecting another end of the first side to another end of the second side,
the second side defines a track width; and
the pole layer is made of a magnetic alloy including any of cobalt, iron and nickel, the method comprising the steps of:
forming an underlying layer in a region in which the track width defining portion is to be disposed, the underlying layer being made of a material having conductivity and whose etching rate of ion beam etching is higher than that of the magnetic alloy used to make the pole layer;
forming the pole layer at least by plating using the underlying layer as an electrode, such that the track width defining portion is disposed on the underlying layer and the end face of the track width defining portion has a width that decreases as a distance from the first side decreases, the pole layer incorporating a first layer and a second layer disposed on the first layer;
removing the underlying layer except a portion below the pole layer by ion beam etching; and
forming the coil,
wherein the step of forming the pole layer includes the steps of:
forming an electrode film that is to be the first layer;
forming a frame with a groove having a shape corresponding to the second layer on the electrode film;
forming the second layer in the groove of the frame by plating using the underlying layer and the electrode film as electrodes;
removing the frame after the second layer is formed; and
forming the first layer by removing the electrode film except a portion below the second layer by ion beam etching.

2. The method according to claim 1, wherein the step of removing the underlying layer includes:
etching two side surfaces of the track width defining portion by ion beam etching.

3. The method according to claim 1, wherein the material of the underlying layer contains any of Ta, Mo, W, Ti, Cr, Ni, Pd, Ru, TiW, TiN, NiCr, PtPd, and NiCu.

* * * * *